(12) United States Patent
Takahashi et al.

(10) Patent No.: US 7,353,111 B2
(45) Date of Patent: Apr. 1, 2008

(54) NAVIGATION SYSTEM PERFORMING ROUTE GUIDANCE FOR VEHICLE

(75) Inventors: Toshiaki Takahashi, Yokohama (JP); Hirofumi Inoue, Yokosuka (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 244 days.

(21) Appl. No.: 11/108,730

(22) Filed: Apr. 19, 2005

(65) Prior Publication Data

US 2005/0256638 A1    Nov. 17, 2005

(30) Foreign Application Priority Data

May 14, 2004    (JP)    ............................ 2004-144938
May 14, 2004    (JP)    ............................ 2004-144941

(51) Int. Cl.
*G01C 21/34*    (2006.01)
(52) U.S. Cl. .................. 701/211; 701/208; 340/995.19
(58) Field of Classification Search .................. None
See application file for complete search history.

(56) References Cited

U.S. PATENT DOCUMENTS

| 5,177,685 | A | | 1/1993 | Davis et al. |
| 5,878,368 | A | * | 3/1999 | DeGraaf ...................... 701/209 |
| 6,049,753 | A | * | 4/2000 | Nimura ....................... 701/201 |
| 6,144,920 | A | * | 11/2000 | Mikame ...................... 701/212 |
| 6,175,803 | B1 | * | 1/2001 | Chowanic et al. ........... 701/209 |
| 6,338,021 | B1 | * | 1/2002 | Yagyu et al. ................ 701/209 |
| 6,370,475 | B1 | | 4/2002 | Breed et al. |
| 6,415,226 | B1 | * | 7/2002 | Kozak ........................ 701/210 |
| 7,133,771 | B1 | * | 11/2006 | Nesbitt ........................ 701/202 |

FOREIGN PATENT DOCUMENTS

| EP | 1 233 389 A2 | 8/2002 |
| JP | 2000-185676 | 7/2000 |
| JP | 2005-63021 | * 3/2005 |

* cited by examiner

*Primary Examiner*—Michael J. Zanelli
(74) *Attorney, Agent, or Firm*—McDermott Will & Emery LLP

(57) ABSTRACT

A preprocessing unit calculates a square sum $SJ(t_n)$ of jerk J, and a driving characteristic calculation unit determines whether the jerk square sum $SJ(t_n)$ is equal to or above a predetermined threshold value. The position/traveling direction determination unit determines the position and traveling direction of the vehicle. A troublesome driving place determination unit records an intersection at which the jerk square sum $SJ(t_n)$ is calculated to be equal to or above the predetermined threshold value and the traveling direction of the vehicle at that time in association with each other in a troublesome driving place database. With reference to the troublesome driving place database, the troublesome driving place determination unit then calculates the risk cost at each intersection around the vehicle for each traveling direction. It is therefore possible to perform route guidance taking the driver's personal feeling into an account.

11 Claims, 24 Drawing Sheets

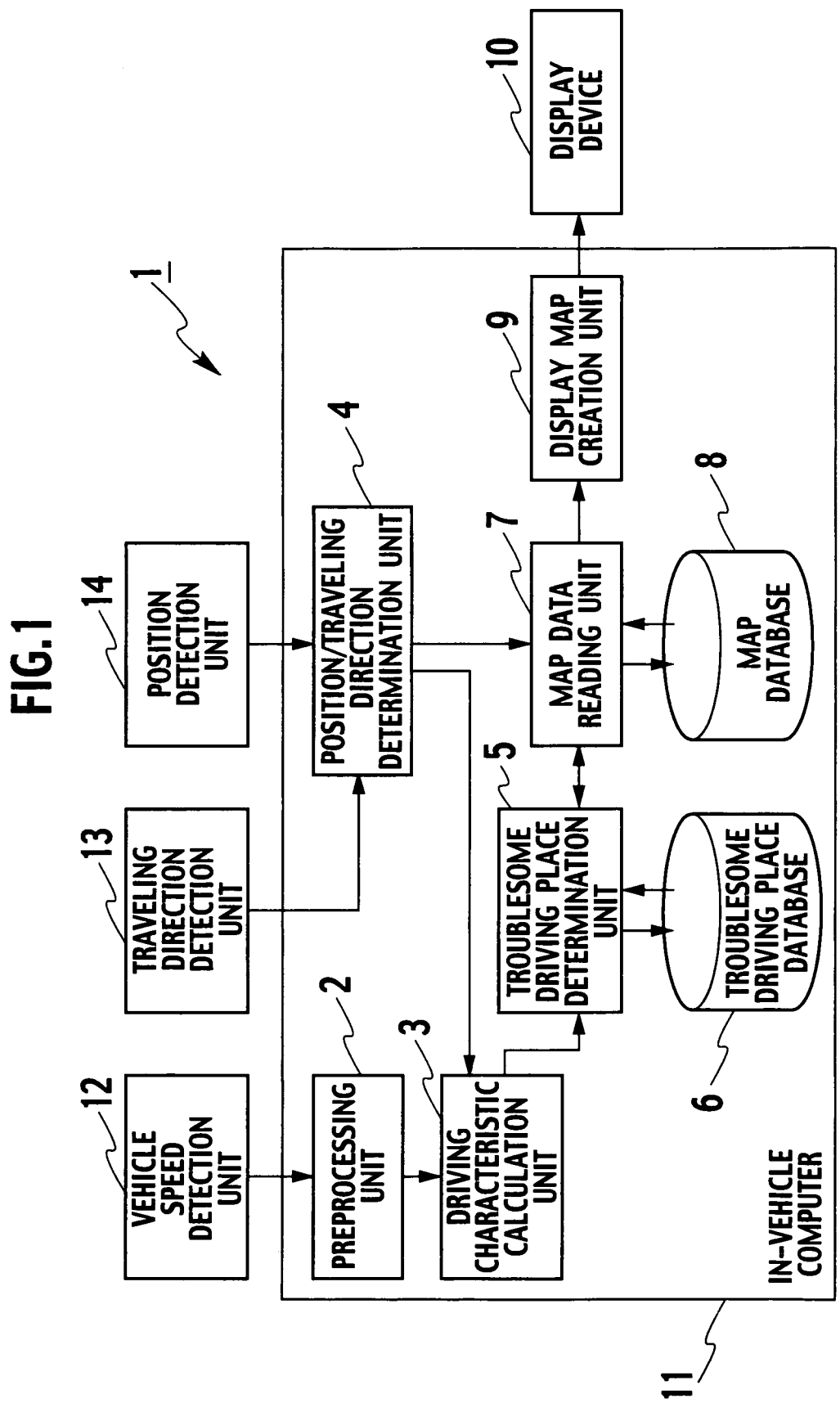

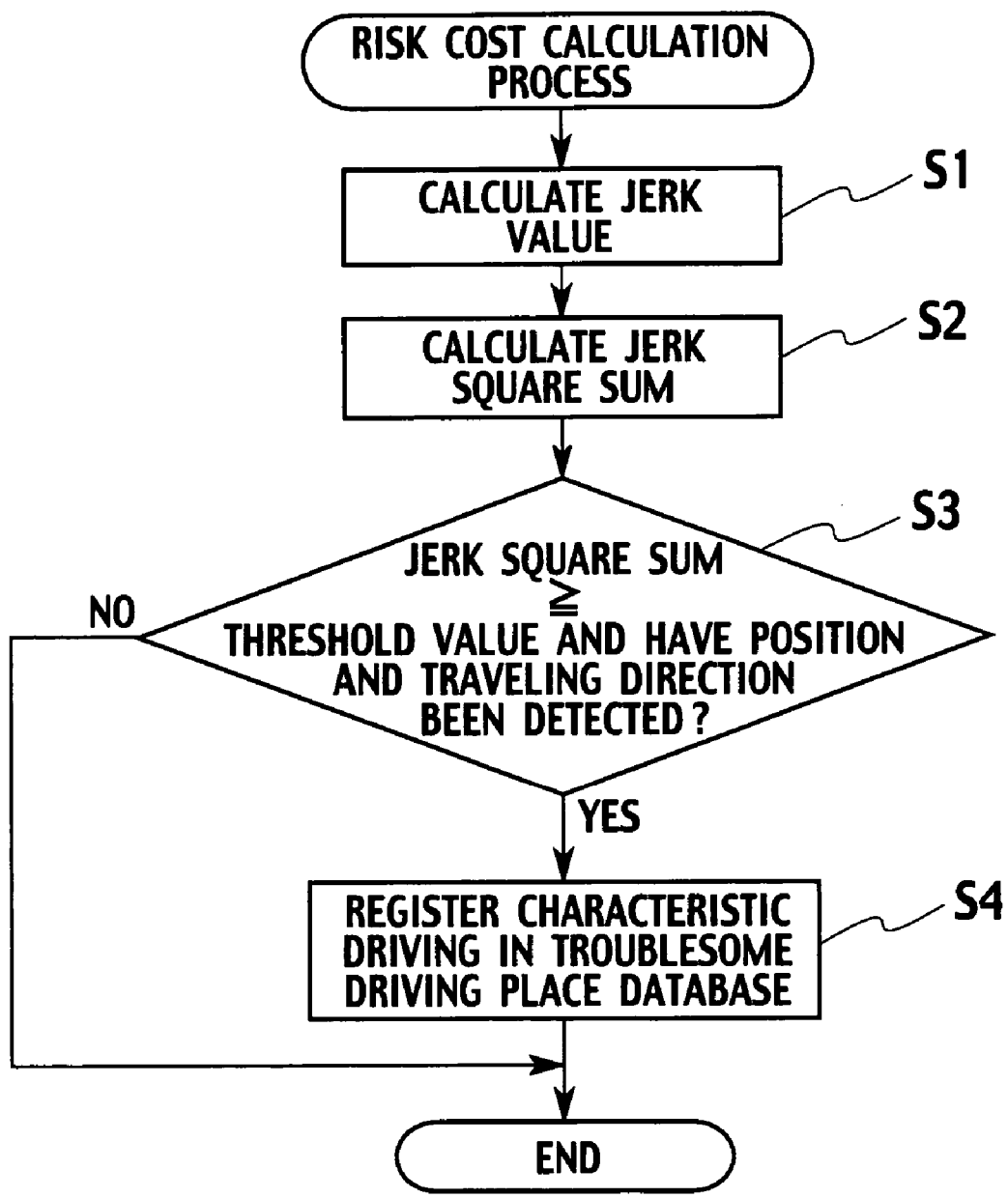

FIG.3

XX INTERSECTION

| TRAVELING DIRECTION | RIGHT TURN | | LEFT TURN | | RIGHT COURSE CHANGE | | LEFT COURSE CHANGE | | GOING STRAIGHT AT INTERSECTION | |
|---|---|---|---|---|---|---|---|---|---|---|
| | TURN SIGNAL : RIGHT | STEERING ANGLE : LARGE | TURN SIGNAL : LEFT | STEERING ANGLE : LARGE | TURN SIGNAL : RIGHT | STEERING ANGLE : SMALL | TURN SIGNAL : LEFT | STEERING ANGLE : SMALL | TURN SIGNAL : NONE | STEERING ANGLE : NONE |
| CHARACTERISTIC DRIVING REGISTERED CONTENT | 1. M1/D1 2. M2/D2 | | 1. M3/D3 | | | | 1. M3/D3 | | | |
| RISK COST | 2 | | 1 | | 0 | | 1 | | 0 | |

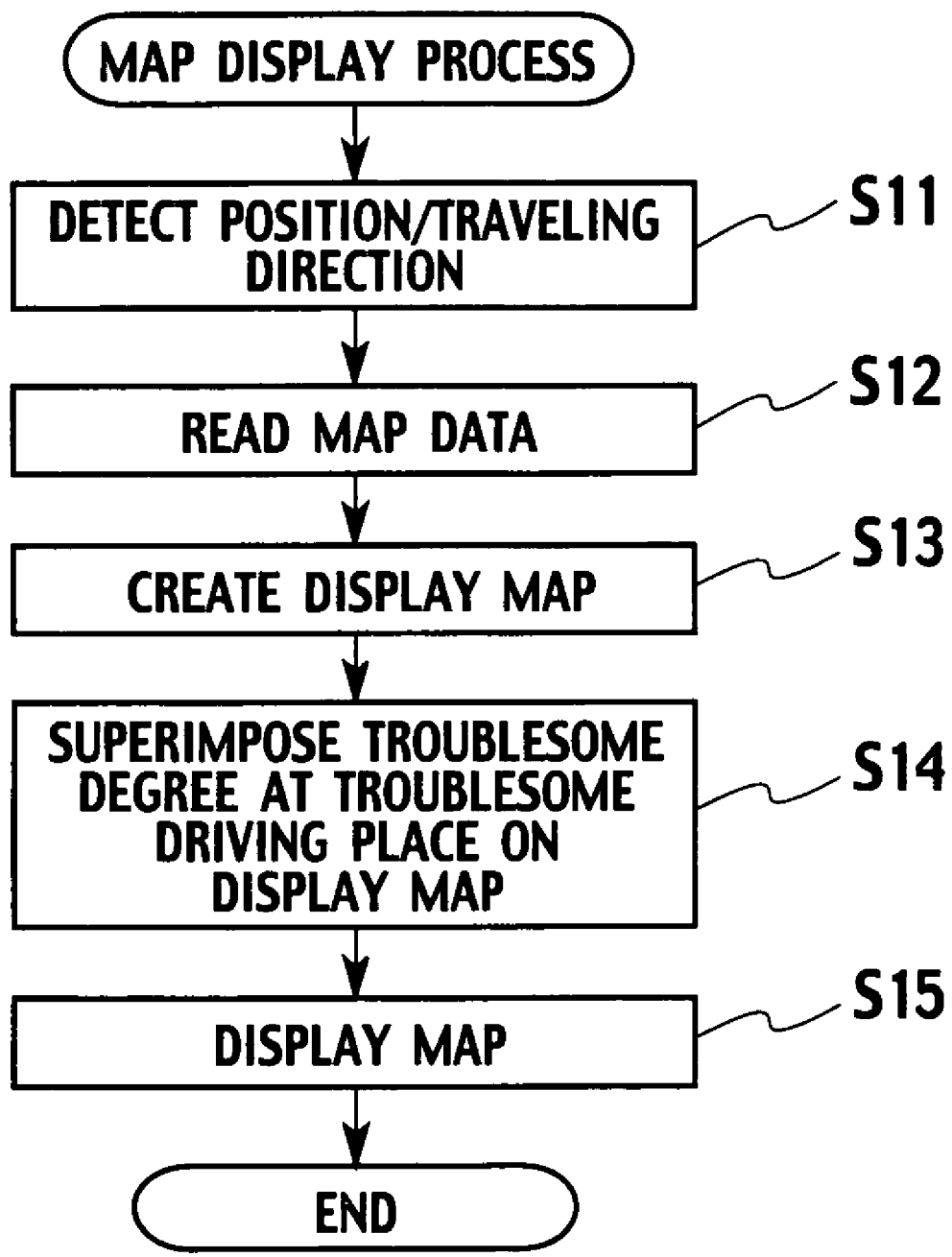

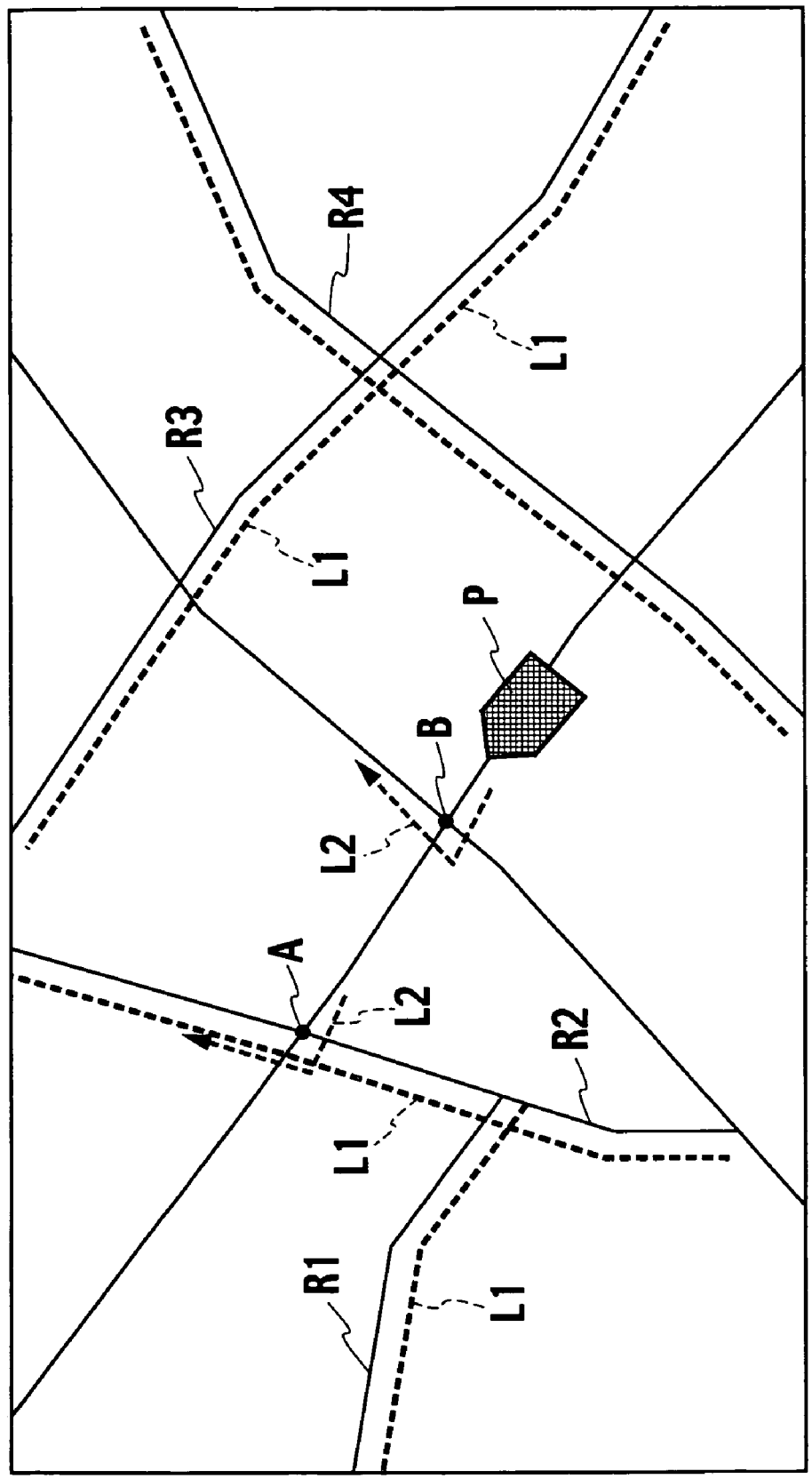

FIG.17

| ENVIRONMENTAL CHANGE FACTOR / SITUATION | BASE | CLOUDY-BLIGHT | RAINY-BLIGHT | CLOUDY-DARK | RAINY-DARK |
|---|---|---|---|---|---|
| RIGHT TURN AT INTERSECTION | 1. M1/D1  2. M2/D2<br>3. M3/D3 | | 1. M3/D3 | | 1. M1/D1<br>2. M2/D2 |
| LEFT TURN AT INTERSECTION | 1. M1/D1<br>2. M2/D2 | | | | 1. M3/D3 |
| GOING STRAIGHT AT INTERSECTION | 1. M3/D3 | | | | 1. M3/D3 |
| GENTLE CURVE | | | | | |
| SHARP CURVE | 1. M3/D3 | | | | 1. M3/D3 |
| NARROW ROAD | 1. M1/D1  2. M2/D2<br>3. M3/D3  4. M2/D2 | 1. M3/D3 | 1. M3/D3 | | 1. M1/D1<br>2. M2/D2 |
| SIDE ROAD | 1. M3/D3 | | | | 1. M3/D3 |

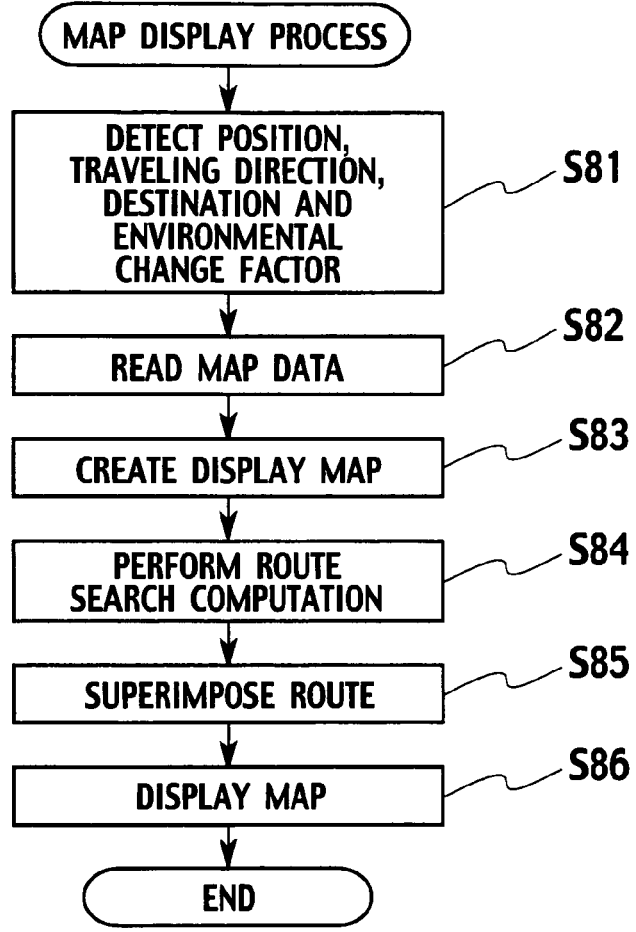
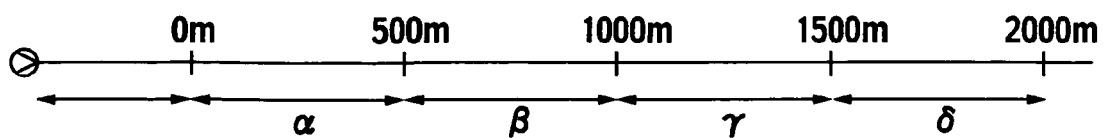

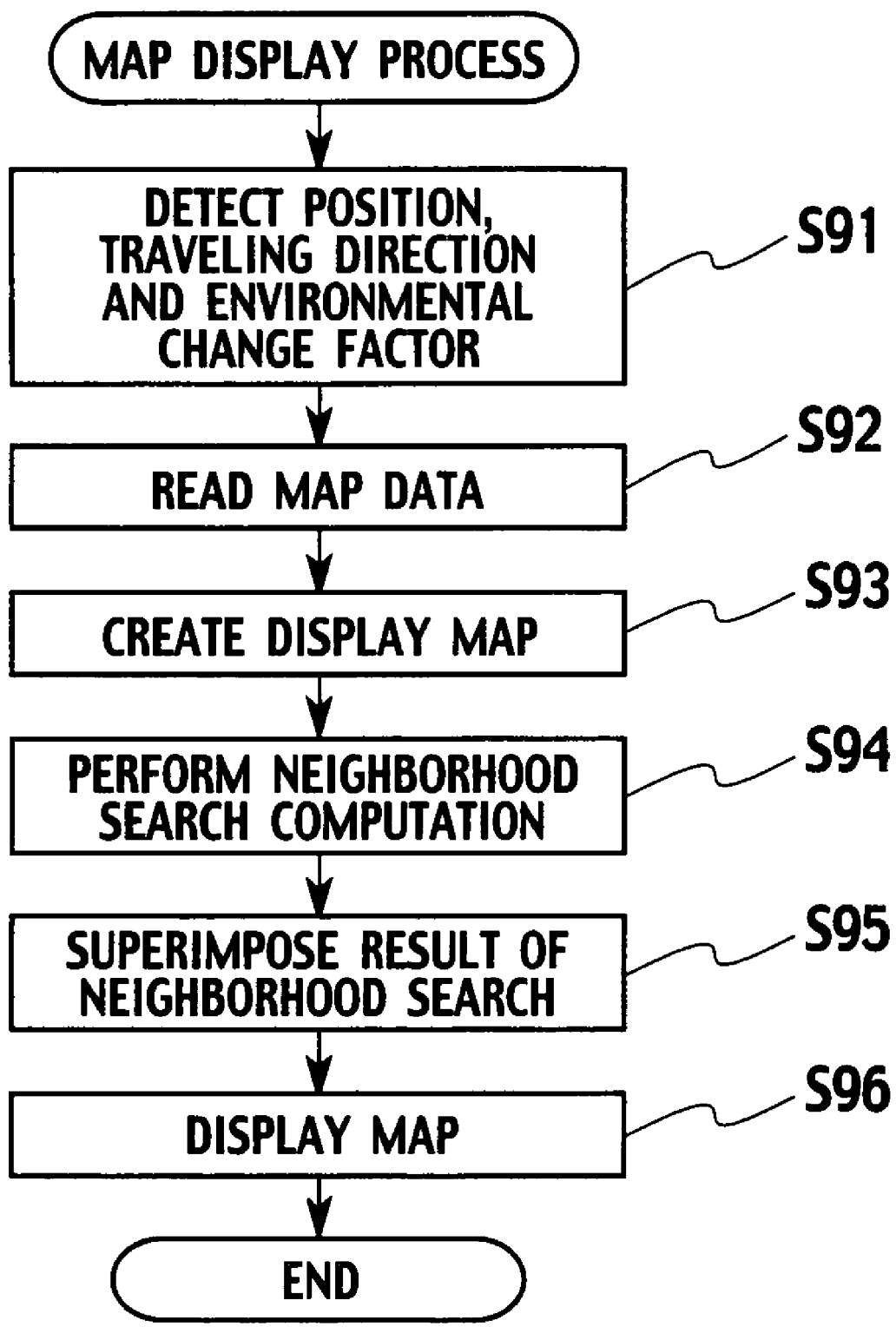

NAVIGATION SYSTEM PERFORMING ROUTE GUIDANCE FOR VEHICLE

BACKGROUND OF THE INVENTION

The present invention relates to navigation system performing route guidance for vehicle.

There has hitherto been known a navigation system to perform route guidance for a vehicle in which the navigation system is mounted (hereinafter, just referred to as the vehicle). According to such a navigation system, it is possible to search for a route to a destination such that required time or distance is minimized or to search for facilities around the vehicle and sort the searched facilities in an ascending order of distance.

On the other hand, recently, as disclosed in the Japanese Patent Laid Open publication No. 2000-185676, a driving control system has been provided, which detects dangerous behaviors of the vehicle, such as rapid start, braking at intersections, rapid acceleration during turning, abrupt steering, and sudden braking, by means of devices such as an angular velocity sensor and an accelerometer and analyzes a driving pattern of a driver.

SUMMARY OF THE INVENTION

However, as described above, the conventional navigation system is configured to perform route guidance based on indices of distance and time and cannot perform route guidance in consideration of indices based on driver's personal feeling including facts that the driver is less likely to be frightened and the driver does not feel bothered. For carrying out such route guidance, it is conceivable that the above driving control system is applied to the navigation system. Since the conventional driving control system is configured to analyze the driving trend of the driver based on the number of dangerous behaviors, the conventional system can analyze the driving trends of the driver such as carefulness of driving and sharpness of acceleration and deceleration but cannot estimate the driver's personal feeling. Accordingly, application of the driving control system to the navigation system cannot achieve route guidance taking into an account of the indices based on the driver's personal feeling.

Moreover, the conventional navigation system cannot perform route guidance taking into an account of driver's risk to environmental change factors such as weather and brightness outside the vehicle since the conventional navigation system is configured to perform route guidance according to the indices of time and distance. For carrying out such route guidance, it is conceivable that the above driving control system is applied to the navigation system. Since the conventional driving control system is configured to analyze the driver's driving trend based on the number of dangerous behaviors, the conventional system can analyze the driver's driving trends such as carefulness of driving and sharpness of acceleration and deceleration but cannot estimate the driver's risk to environmental change factors. Accordingly, application of the driving control system to the navigation system cannot achieve route guidance taking into an account of the indices based on the driver's risk to environmental change factors.

The present invention was made to solve the above problems, and an object of the present invention is to provide a navigation system capable of performing route guidance in consideration of driver's personal feeling.

Moreover, the present invention was made to solve the above problems, and another object of the present invention is to provide a navigation system capable of performing route guidance in consideration of the driver's risk to the environmental change factors.

To solve the aforementioned problem, a navigation system according to a first aspect of the present invention calculates a value obtained by accumulating an absolute value or a square value of a jerk in a certain period of time; records information of an intersection at which the accumulated value is calculated to be equal to or above a predetermined threshold value and information of the traveling direction of the vehicle at the intersection in association with each other in a troublesome driving place database; and calculates a risk cost of a driver at each of intersections around the vehicle for each traveling direction of the vehicle with reference to the troublesome driving place database.

With the navigation system according to the first aspect of the present invention, the information of the intersection at which the accumulated value is calculated to be equal to ore above the predetermined threshold value and the information of the traveling direction of the vehicle at that intersection are recorded as a history, and the risk cost of the driver at each intersection around the vehicle is calculated for each traveling direction of the vehicle with reference to the history. It is therefore possible to perform route guidance taking the driver's personal feeling into an account.

To solve the aforementioned problems, a navigation system according to a second aspect of the present invention calculates a value obtained by accumulating an absolute value or a square value of a jerk in a certain period of time; records information of a traveling situation of the vehicle and information of an environmental change factor at the time when the accumulated value is calculated to be equal to or above a predetermined threshold value in association with each other in an environmental change risk database; and calculates a risk cost of a driver to the environmental change factor outside the vehicle for each traveling situation with reference to the environmental change risk database.

With the navigation system according to the second aspect of the present invention, the information of the traveling situation of the vehicle and information of the environmental change factor at the time when the accumulated value is calculated to be equal to or above the predetermined threshold value are recorded as a history, and the risk cost of the driver to the environmental change factor outside the vehicle is calculated for each traveling situation with reference to the history. It is therefore possible to perform route guidance taking the risk of the driver to the environmental change factor into an account.

BRIEF DESCRIPTION OF THE DRAWINGS

FIG. 1 is a block diagram showing a configuration of a navigation system as a first embodiment of the present invention.

FIG. 2 is a flowchart showing a flow of a risk cost calculation process as the first embodiment of the present invention.

FIG. 3 is a view showing a structure of a troublesome driving place database shown in FIG. 1.

FIG. 4 is a flowchart showing a flow of a map display process as the first embodiment of the present invention.

FIG. 5 is a view showing risk costs superimposed on a map screen.

FIG. 17 is a view showing a structure of an environmental change risk database shown in FIG. 15.

FIG. 23 is a flowchart showing a flow of a map display process as the seventh embodiment of the present invention.

FIG. 24 is a view for illustrating a process to change a weight for a link cost according to size of the risk cost.

FIG. 26 is a flowchart showing a flow of a map display process as the eighth embodiment of the present invention.

DETAILED DESCRIPTION OF THE PREFERRED EMBODIMENTS

Figure 6:
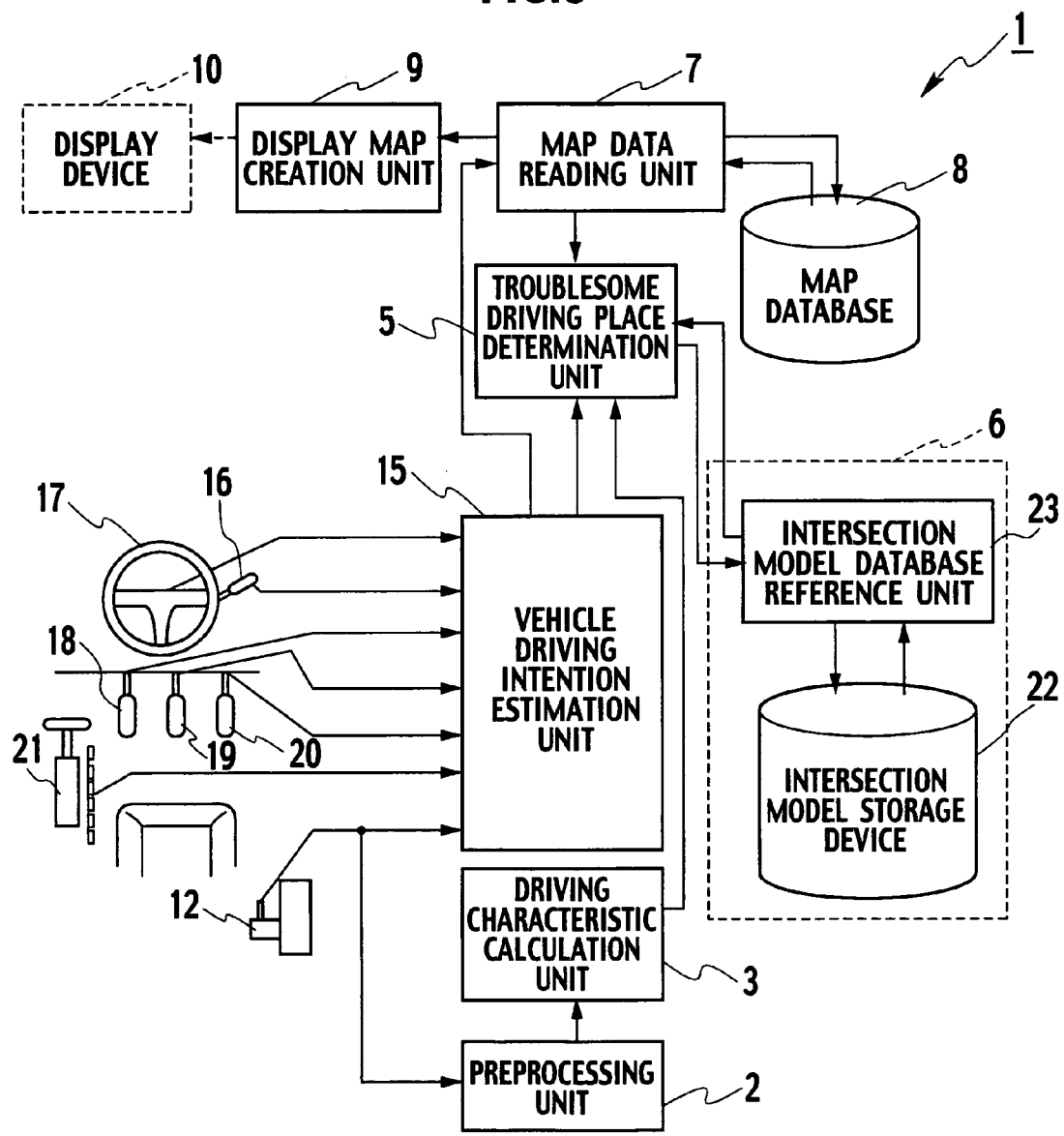
FIG. 6 is a block diagram showing a configuration of a modified example of the navigation system of the first embodiment of the present invention.

First, a description is given of a configuration and an action of a navigation system as a first embodiment of the present invention with reference to FIGS. 1 to 5.

A navigation system 1 as the first embodiment of the present invention includes, as shown in FIG. 1, a preprocessing unit 2, a driving characteristic calculation unit 3, a position/traveling direction determination unit 4, a troublesome driving place determination unit 5, a troublesome driving place database 6, a map data reading unit 7, a map database 8, and a display map creation unit 9 as main components. The navigation system 1 is configured to display map information on a display device 10 such as a liquid crystal display to perform route guidance for a vehicle.

In this embodiment, each of the components of the preprocessing unit 2, the driving characteristic calculation unit 3, the position/traveling direction determination unit 4, the troublesome driving place determination unit 5, the map data reading unit 7, and the display map creation unit 9 is implemented by an in-vehicle computer 11 executing a computer program defining a function (action) of the component. The troublesome driving place database 6 and map database 8 are stored in a memory within the in-vehicle computer 11 or a storage medium such as a CD-ROM and are read out when used.

The in-vehicle computer 11 is connected to a speed detection unit 12, a traveling direction detection unit 13, and a position detection unit 14. The speed detection unit 12 is a wheel speed sensor or the like and detects speed of the vehicle. The traveling direction detection unit 13 detects a direction that the vehicle is traveling by detecting an operation of a turn signal lever or a steering angle. The position detection unit 14 detects the position of the vehicle using radio signals emitted from a GPS (Global Positioning System) satellite.

The troublesome driving place database 6 stores a risk cost for a driving action of a driver at each intersection as described in detail later. In this specification, the "risk cost" indicates a driver's personal troublesome degree in a driving action at each intersection, such as turning right, turning left, or changing lanes. In this embodiment, a larger risk cost of a driving operation at an intersection means that the driver is poorer at the driving operation at the intersection.

The map database 8 stores node information indicating location information of roads, link information indicating connections of roads, road level (type) information of each road link determined by size of the road or a manager/operator of the road, name information of roads, speed limits of individual road links, and road network data for route search in which conditions including travel distance or average travel time are associated with a cost for each node to perform route computation.

The navigation system 1 having the above configuration executes a risk cost calculation process and a map display process shown below to calculate the risk costs of driving actions of the driver at each intersection and perform route guidance using the calculated risk costs. Hereinafter, a detailed description is given of an action of the navigation system 1 executing the risk cost calculation process and map display process with reference to flowcharts shown in FIGS. 2 and 4.

First, with reference to the flowchart shown in FIG. 2, a description is given of an action within the navigation system 1 when the risk cost calculation process is executed to calculate the risk costs of the driving actions of the driver at each intersection.

The flowchart shown in FIG. 2 starts in response to power supply to the navigation system 1 being turned on, and the calculation process proceeds to a process of step S1. The calculation process is repeatedly executed each time the vehicle passes an intersection.

In the process of the step S1, the preprocessing unit 2 detects a vehicle speed V through the speed detection unit 12 and calculates a second-order differential value (hereinafter, referred to as a jerk) J of the detected vehicle speed V using the following equation (1). A parameter A in the equation (1) indicates acceleration of the vehicle. The process of the step S1 is thus completed, and the calculation process proceeds from the process of the step S1 to a process of step S2.

$$J = dA/dt = d^2v/dt^2 \quad (1)$$

In the process of the step S2, the preprocessing unit 2 calculates a square value $J^2$ (or absolute value |J|) of the jerk J calculated by the process of the step S2 and assigns the calculated square value $J^2$ to the following equation (2), thus calculating a jerk square sum $SJ(t_n)$ at a time $t_n$. Herein, a parameter t in the equation (2) indicates time. This equation (2) means that the square values $J^2$ of jerks J from a time $t_{n-m}$ to a time $t_{n+m}$ are added up to calculate the jerk square sum $SJ(t_n)$. In the case of calculating the absolute value |J| of the jerk J, the preprocessing unit 2 adds up the jerk absolute value |J| from a time $t_{n-m}$ to a time $t_{n+m}$ to calculate a jerk absolute sum. The process of the step S2 is thus completed, and the calculation process proceeds from the process of the step S2 to a process of step S3.

$$SJ(t_n) = \Sigma J^2 (t = t_{n-m} \ldots t_{n+m}) \quad (2)$$

In the process of the step S3, the driving characteristic calculation unit 3 determines whether the square sum $SJ(t_n)$ of the jerk J calculated by the process of the step S2 is equal to or above a predetermined threshold value and whether the position/traveling direction determination unit 4 has detected the position and the traveling direction of the vehicle. As a result of the judgment, when the square sum $SJ(t_n)$ of the jerk J is equal to or above the predetermined threshold value and the position/traveling direction determination unit 4 detects the position and the traveling direction of the vehicle, the driving characteristic calculation unit 3 determines that that the driver's personal characteristic driving is detected and advances the calculation process to a process of step S4. On the other hand, in the other cases, the driving characteristic calculation unit 3 terminates the series of steps of the calculation process. In the specification, the "characteristic driving" means a driving state of the vehicle (=a driver's driving action) when the jerk square sum $SJ(t_n)$ equal to or above the predetermined threshold value is detected. In this embodiment, the driving state of the vehicle is described by information of the position and traveling direction of the vehicle when the jerk square sum $SJ(t_n)$ equal to or above the predetermined threshold value is detected.

In the process of the step S4, the map data reading unit 7 reads map information corresponding to the position and traveling direction of the vehicle detected by the position/traveling direction determination unit 4 from the map database 8. With reference to the read map information, the troublesome driving place determination unit 5 enters a name of an intersection in which the jerk square sum $SJ(t_n)$ is calculated to be equal to or above the predetermined threshold value and information of the traveling direction of the vehicle at that time in the troublesome driving place database 6 as characteristic driving information in association with each other.

More specifically, in this embodiment, the troublesome driving place determination unit 5 creates a table in the troublesome driving place database 6, the table including fields for five traveling directions including a right turn, a left turn, a course change to the right, a course change to the left, and going straight at the intersection. The troublesome driving place determination unit 5 reads the table of the intersection where the characteristic driving is detected and then records the current date in a field corresponding to the traveling direction of the vehicle at that time.

In the case of using the table shown in FIG. 3, when it is detected by the position/traveling direction determination unit 4 that the turn signal indicates the right direction and the steering angle is large, the troublesome driving place determination unit 5 determines that the driver made a right turn at the intersection. Similarly, the troublesome driving place determination unit 5 determines that a driver made: a left turn when it is detected that the turn signal indicates the left direction and the steering angle is large; a right lane change, when it is detected that the turn signal indicates the right direction and the steering angle is small; a course change to the left, when it is detected that the turn signal indicates the left direction and the steering angle is small; and going straight, when no operation of the turn signal lever and no steering angle are detected.

Upon the characteristic driving information being recorded in the troublesome driving place database 6 in such a manner, the troublesome driving place determination unit 5 tallies the cumulative number of dates recorded at each intersection for each traveling direction, thus calculating the risk cost of the driver at each intersection for each traveling direction. Specifically, in the table shown in FIG. 3, in a field corresponding to the traveling direction of the "right turn", the cumulative number of dates is 2. The troublesome driving place determination unit 5 therefore obtains 2 as the risk cost when the driver turns right at an xx intersection. Similarly, in fields corresponding to the traveling directions of the "left turn" and the "left course change", the cumulative numbers of dates are 1. The troublesome driving place determination unit 5 therefore obtains 1 as the risk costs when the driver turns left at the xx intersection and when the driver changes the course to the left at the xx intersection. The troublesome driving place determination unit 5 can determines that the driver is poorer at turning right than at changing the course to the left at the xx intersection.

In this embodiment, the troublesome driving place determination unit 5 tallies the number of recorded dates at each intersection for each traveling direction to calculate the risk cost of the driver at each intersection for each traveling direction. However, the risk cost of the driver can be calculated by calculating, for each traveling direction, a cumulative value of the jerk square sums $SJ(t_n)$ equal to or above the predetermined threshold value, a value obtained by dividing the cumulative number of dates recorded or the cumulative value of the jerk square sums $SJ(t_n)$ by the number of times that the vehicle has passed the intersection, and a maximum value of the jerk square sums $SJ(t_n)$ and using the calculated value. The process of the step S4 is thus completed, and the series of steps of the risk cost calculation process is terminated.

Next, a description is given of an action of the navigation system 1 executing the map display process (route guidance process) using the risk costs calculated as described above with reference to a flowchart of FIG. 4.

The flowchart shown in FIG. 4 starts upon the driver operating the navigation system 1 to order execution of route guidance, and the display process proceeds to a process of step S11.

In the process of the step S11, the position/traveling direction determination unit 4 detects the current position and traveling direction of the vehicle through the traveling direction detection unit 13 and position detect unit 14. The process of the step S11 is thus completed, and the display process proceeds from the process of the step S11 to a process of step S12.

In the process of the step S12, the map data reading unit 7 reads map data corresponding to the current position and traveling direction of the vehicle detected by the process of the step S11 from the map database 8. The process of the step S12 is thus completed, and the display process proceeds from the process of the step S12 to a process of step S13.

In the process of the step S13, the display map creation unit 9 creates a map screen showing information of the current position of the vehicle and map information around the vehicle by use of the map data read by the process of the step S12. The process of the step S13 is thus completed, and the display process proceeds from the process of the step S13 to a process of step S14.

In the process of the step S14, the map data reading unit 7 reads the risk costs of the driver at each intersection present within the map screen from the troublesome driving place database 6 through the troublesome driving place determination unit 5. The display map creation unit 9 superimposes the read risk costs on the position of each intersection. The process of the step S14 is thus completed, and the display process proceeds from the process of the step S14 to a process of step S15.

In the process of the step S15, the display map creation unit 9 displays the map screen with the risk costs superimposed thereon on the display device 10. Specifically, the display map creation unit 9 displays a current position P of the vehicle as shown in FIG. 5 and displays points and traveling directions with the risk costs of 1 and 2 by dashed lines L1 and L2, respectively.

In the example shown in FIG. 5, the dashed lines L1 and L2 indicate that the driver is poor at driving straight on roads R1, R2, R3, and R4 for examples because the width thereof is small and that the driver is poor at turning right at the intersections A and B, for example, because of many lanes. The process of the step S15 is thus completed, and the series of steps of the display process is terminated.

As apparent from the above description, according to the navigation system 1 as the first embodiment of the present invention, the preprocessing unit 2 calculates the square sums $SJ(t_n)$ of the jerk J, and the driving characteristic calculation unit 3 determines whether each jerk square sum $SJ(t_n)$ is equal to or above the predetermined threshold value. The position/traveling direction determination unit 4 determines the position and traveling direction of the vehicle.

The troublesome driving place determination unit 5 records the name of an intersection where the calculated jerk square sum $SJ(t_n)$ is calculated to be equal to or above the predetermined threshold value and the information of the traveling direction of the vehicle at that time in the troublesome driving place database 6 in association with each other. The troublesome driving place determination unit 5 then calculates the risk cost of the driver at each intersection around the vehicle for each traveling direction of the vehicle with reference to the troublesome driving place database 6, thus achieving route guidance taking driver's personal feeling into account.

According to the navigation system 1 as the first embodiment of the present invention, the display map creation unit 9 displays the map information around the vehicle on the display device 10 and superimposes the risk costs calculated by the troublesome driving place determination unit 5 at positions corresponding to the intersections on the map. Accordingly, the driver can check the intersections and traveling directions with high risk costs, in other words, with high troublesome degree on the map screen.

In this embodiment, the navigation system 1 is configured to store the history of detecting the jerk square sums $SJ(t_n)$ equal to or above the predetermined threshold value and cannot calculate the risk costs at an intersection where the driver has never traveled. Therefore, as a modified example of the aforementioned navigation system 1, the troublesome driving place database 6 can be configured to store a plurality of intersection shape patterns, determine, from the plurality of intersection shape patterns, a pattern similar to the shape of an intersection where the jerk square sum $SJ(t_n)$ is calculated to be equal to or above the predetermined threshold value, and store the history for each intersection shape pattern.

With such a configuration, the histories of detecting the jerk square sums $SJ(t_n)$ equal to or above the predetermined threshold value are classified by the intersection shape patterns and recorded. Accordingly, even the risk costs of an intersection where the driver has never traveled can be calculated when the intersection has a similar shape to any of the intersection shape patterns stored. Hereinafter, a configuration of the navigation system 1 in this case is described with reference to FIGS. 6 and 7.

The modified example of the aforementioned navigation system 1 includes, as shown in FIG. 6, the preprocessing unit 2, the driving characteristic calculation unit 3, the troublesome driving place determination unit 5, the troublesome driving place database 6, the map data reading unit 7, the map database 8, the display map creation unit 9, and a vehicle driving intention estimation unit 15 as main components. The configurations and actions of the preprocessing unit 2, the driving characteristic calculation unit 3, the map data reading unit 7, the map database 8, and the display map creation unit 9 are the same as those in the aforementioned navigation system 1, and the following description is given only of the troublesome driving place determination unit 5, the troublesome driving place database 6, and the vehicle driving intention estimation unit 15.

The above vehicle driving intention estimation unit 15 estimates the traveling direction of the vehicle at an intersection that the vehicle reaches next according to operations of a turn signal lever 16 and a steering 17, operation amounts of a clutch pedal 18, a brake pedal 19, and an acceleration pedal 20, a gear position of a shift selector 21, and the vehicle speed detected by the speed detection unit 12 and then inputs information of the estimated traveling direction to the troublesome driving place determination unit 5.

The troublesome driving place determination unit 5 reads map data of the next approaching intersection from the map database 8 through the map data reading unit 7 and processes the read map data into intersection shape data including information of intersection shape, intersecting angle, priority of each road, and the number of lanes of each road. The troublesome driving place determination unit 5 inputs the created intersection shape data to the intersection database 6 with the information of the traveling direction inputted by the vehicle driving intention estimation unit 15.

Figure 7:
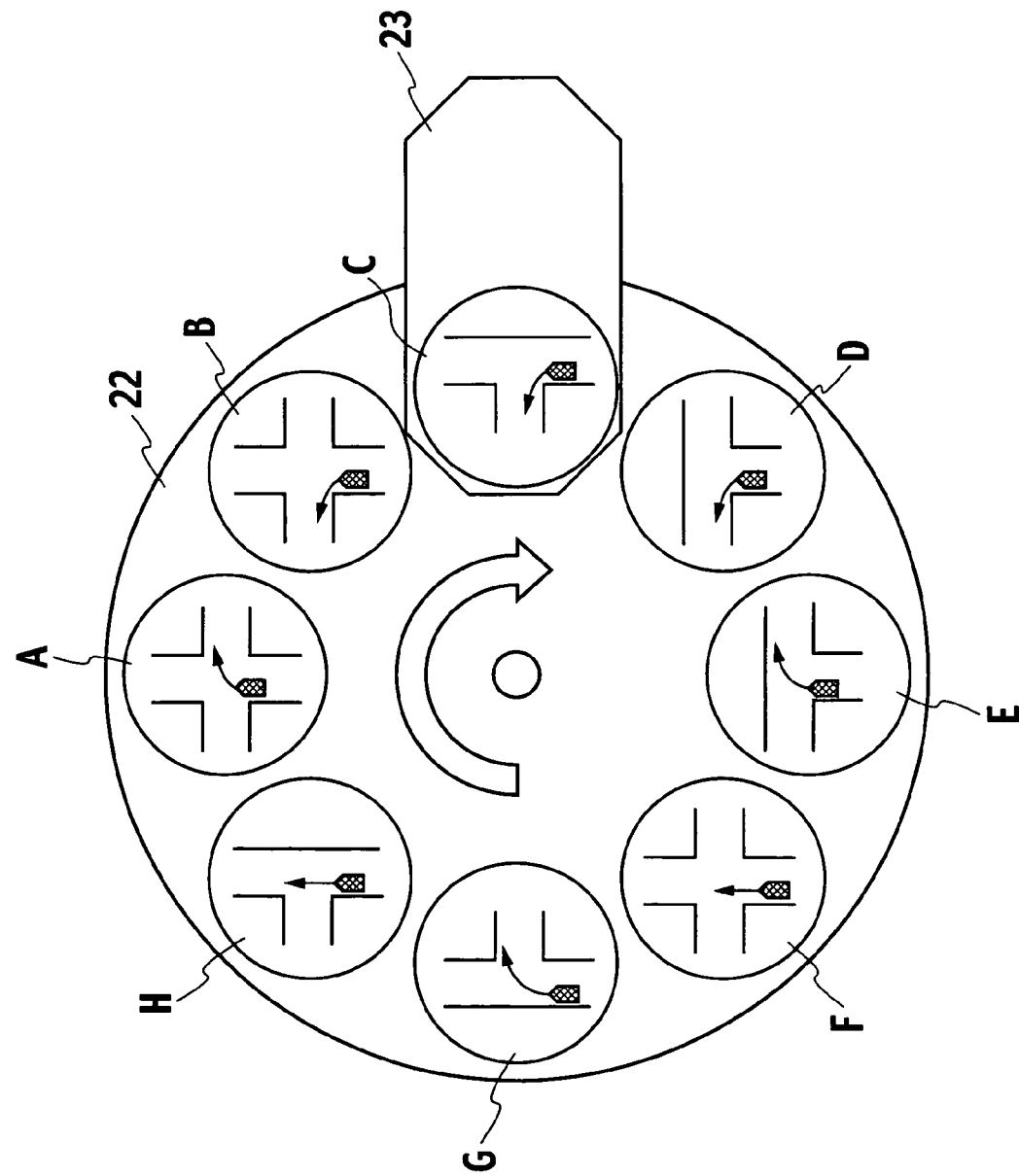
FIG. 7 is a view showing an internal structure of an intersection model storage device and an intersection model database reference unit shown in FIG. 6.

As shown in FIG. 7, the troublesome driving place database 6 includes an intersection model storage device 22 storing intersection shape patterns A to G classified by shapes of intersections and the traveling directions at the intersections. The intersection model storage device 22 stores a history of detecting the jerk square sums $SJ(t_n)$ equal to or above the predetermined threshold value for each intersection shape pattern. The troublesome driving place database 6 includes an intersection model database reference unit 23. According to the traveling direction of the vehicle and the intersection shape data at the intersection that the vehicle reaches next, from the intersection shape patterns A to G, the intersection model database reference unit 23 determines the intersection shape pattern corresponding to the shape of the intersection that the vehicle reaches next and the traveling direction at that intersection. The intersection model database reference unit 23 then returns the risk cost calculated from the history corresponding to the determined intersection shape pattern to the troublesome driving place determination unit 5.

Herein, the above intersection shape patterns A to G are a pattern in which the vehicle turns right at a crossing, a pattern in which the vehicle turns left at a crossing, a pattern in which the vehicle turns left at a T-junction to a branch, a pattern in which the vehicle turns left at a T-junction from a branch, a pattern in which the vehicle turns right at a T-junction from a branch, a pattern in which the vehicle goes straight through a crossing, a pattern in which the vehicle turns right at a T-junction to a branch, and a pattern in which the vehicle goes straight through a T-junction, respectively.

The intersection shape patterns are not limited to the aforementioned eight patterns. A plurality of patterns are conceivable according to factors such as intersecting shapes, intersecting angles, priorities of a road where the vehicle is traveling and a road crossing the same, the number of lanes of the road where the vehicle is traveling, and the number of lanes of a road crossing the road where the vehicle is traveling. Moreover, it is possible to prepare not only the intersection shape patterns but also a plurality of patterns based on changes in lane width and curve shapes.

Figure 8:
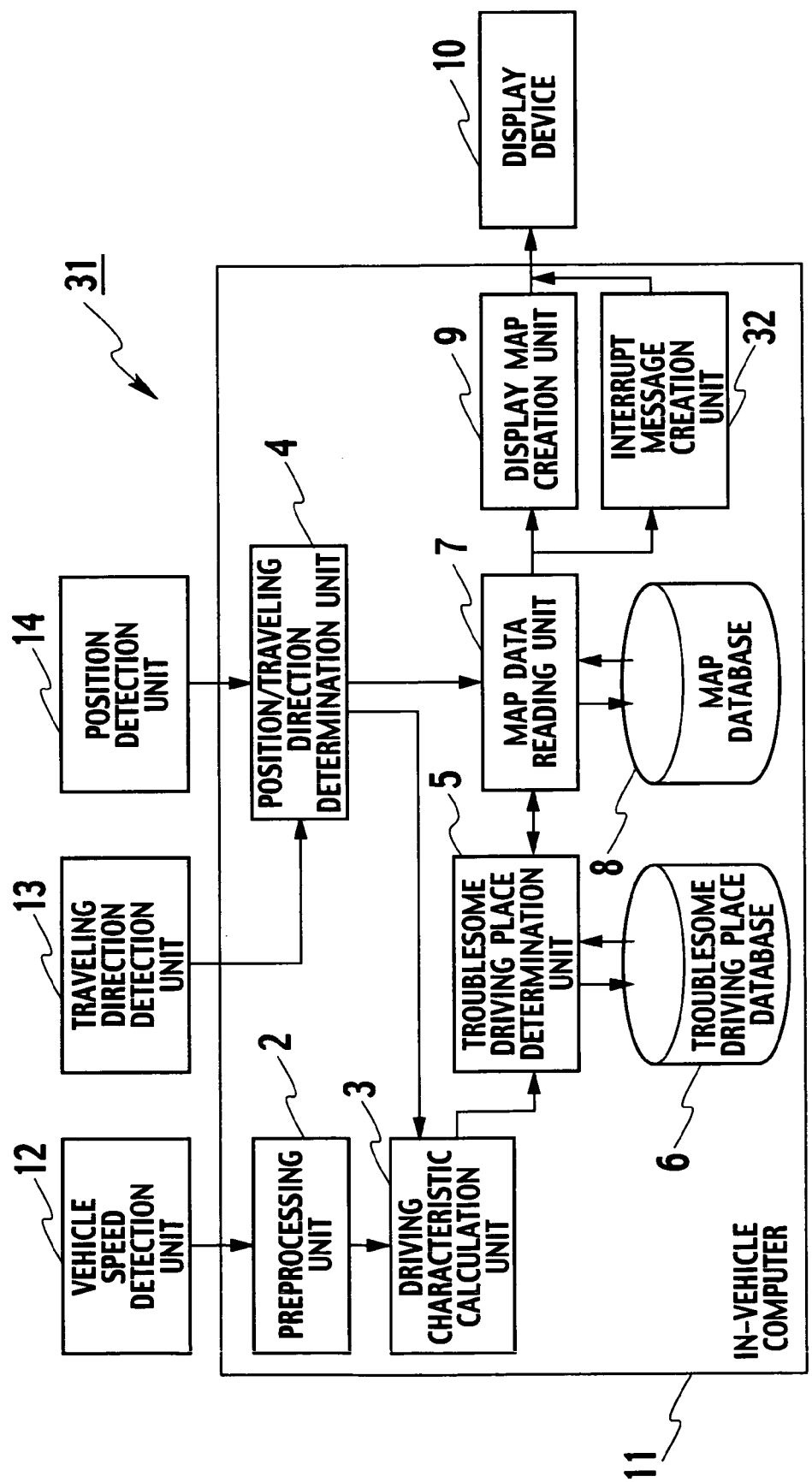
FIG. 8 is a block diagram showing a configuration of a navigation system as a second embodiment of the present invention.
Figure 9:
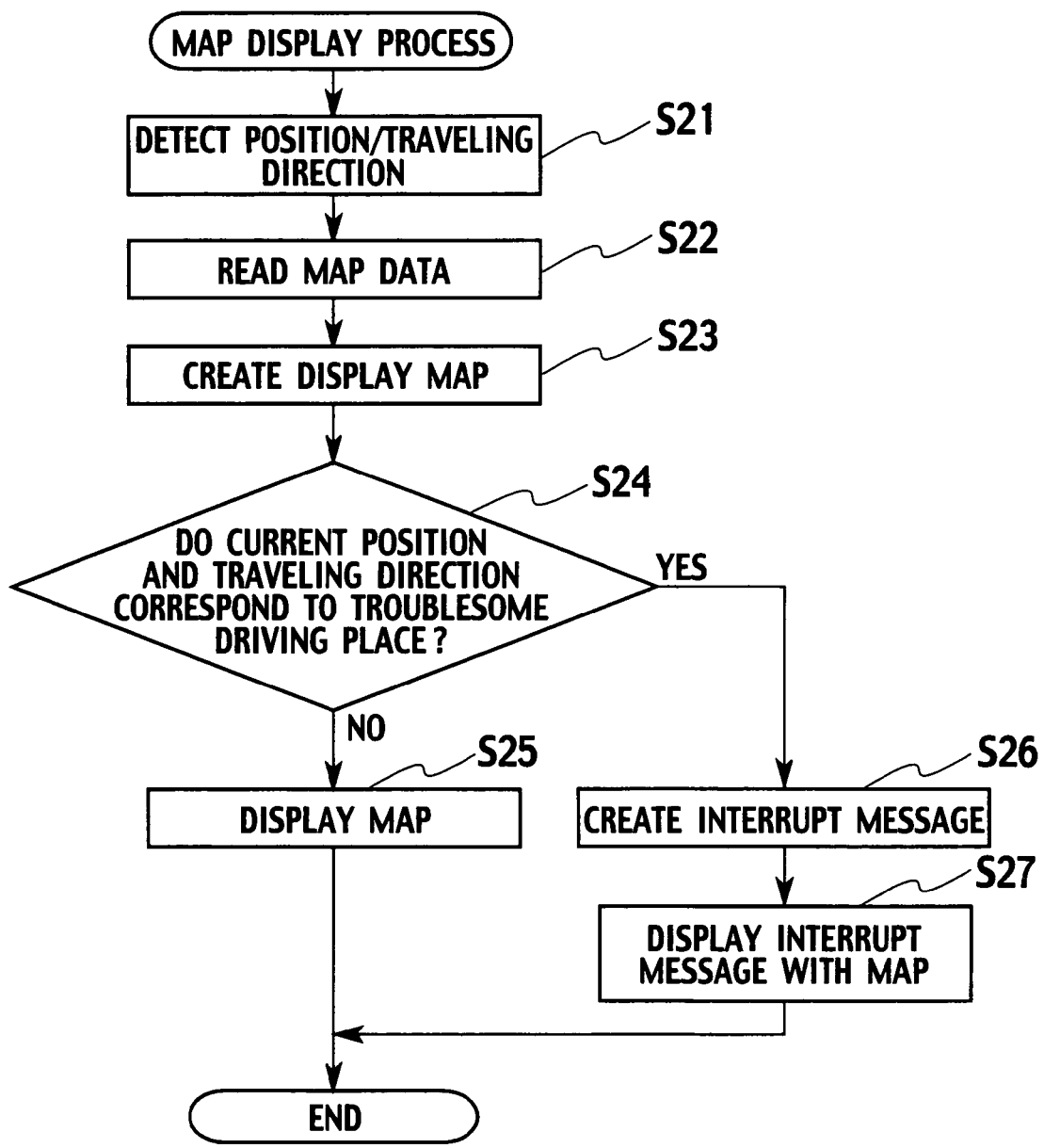
FIG. 9 is a flowchart showing a flow of a map display process as the second embodiment of the present invention.

Next, a description is given of a configuration and an action of a navigation system as a second embodiment of the present invention with reference to FIGS. 8 and 9.

A navigation system 31 as the second embodiment of the present invention includes, as shown in FIG. 8, includes the preprocessing unit 2, the driving characteristic calculation unit 3, the position/traveling direction determination unit 4, the troublesome driving place determination unit 5, the troublesome driving place database 6, the map data reading unit 7, the map database 8, the display map creation unit 9, and an interrupt message creation unit 32 as main components. The navigation system 31 is configured to display a message urging the driver to drive safely on the display device 10 in response to the vehicle traveling in the traveling direction with a high risk cost at an intersection. Each of the components of the preprocessing unit 2, the driving characteristic calculation unit 3, the position/traveling direction determination unit 4, the troublesome driving place determination unit 5, the map data reading unit 7, the display map creation unit 9, and the interrupt message creation unit 32 is implemented by the in-vehicle computer 11 executing a computer program defining a function (action) of the component.

The navigation system 31 having the aforementioned configuration executes the following map display process to display on the display device 10 a message urging the driver to drive safely in response to the vehicle traveling in the traveling direction with high risk cost at an intersection. Hereinafter, a detailed description is given of an action of the navigation system 31 executing the map display process with reference to a flowchart shown in FIG. 9. The risk cost calculation process in the navigation system 31 as the second embodiment is the same as that of the aforementioned first embodiment, and the description thereof is omitted.

The flowchart shown in FIG. 9 starts upon the driver operating the navigation system 31 to order route guidance, and the display process proceeds to a process of step S21.

In the process of the step S21, the position/traveling direction determination unit 4 detects the current position and traveling direction of the vehicle through the traveling direction detection unit 13 and position detection unit 14. The process of the step S21 is thus completed, and the display process proceeds from the process of the step S21 to a process of step S22.

In the process of the step S22, the map data reading unit 7 reads map data corresponding to the current position and traveling direction of the vehicle detected by the process of the step S21 from the map database 8. The process of the step S22 is thus completed, and the display process proceeds from the process of the step S22 to a process of step S23.

In the process of the step S23, the display map creation unit 9 creates a map screen showing the information of the current position of the vehicle and the map information around the vehicle by use of the map data read by the process of the step S22. The process of the step S23 is thus completed, and the display process proceeds from the process of the step S23 to a process of step S24.

In the process of the step S24, the map data reading unit 7 determines whether the combination of the current position and traveling direction of the vehicle matches any of the combinations of the positions and traveling directions which are high in risk costs and stored in the troublesome driving place database 6. As a result of the judgment, when the combination of the current position and traveling direction matches any of the combinations of the stored positions and traveling directions, the map data reading unit 7 advances the display process from the process of the step S24 to a process of step S26. On the other hand, when the combination of the current position and traveling direction does not match any of the combinations of the stored positions and traveling directions, the map data reading unit 7 advances the display process from the process of the step S24 to a process of step S25.

In the process of the step S25, the display map creation unit 9 displays the map screen created by the process of the step S23 on the display device 10. The process of the step S25 is thus completed, and the series of steps of the display process is terminated.

In the process of the step S26, the interrupt message creation unit 32 creates a message promoting safe driving. The process of the step S26 is thus completed, and the display process proceeds from the process of the step S26 to a process of step S27.

In the process of the step S27, the display map creation unit 9 displays the map screen created by the process of the step S23 on the display device 10, and the interrupt message creation unit 32 displays the message created by the process of the step S26 as an interrupt message on the display device 10. The process of the step S27 is thus completed, and the series of steps of the display process is terminated.

As apparent from the above description, according to the navigation system 31 as the second embodiment of the present invention, the interrupt message creation unit 32 displays the message urging the driver to drive safely on the display device 10 as the interrupt message in response to the vehicle traveling in the traveling direction with a high risk cost at each intersection. Accordingly, it is possible to alert the driver when the driver is driving at a high risk cost.

Figure 10:
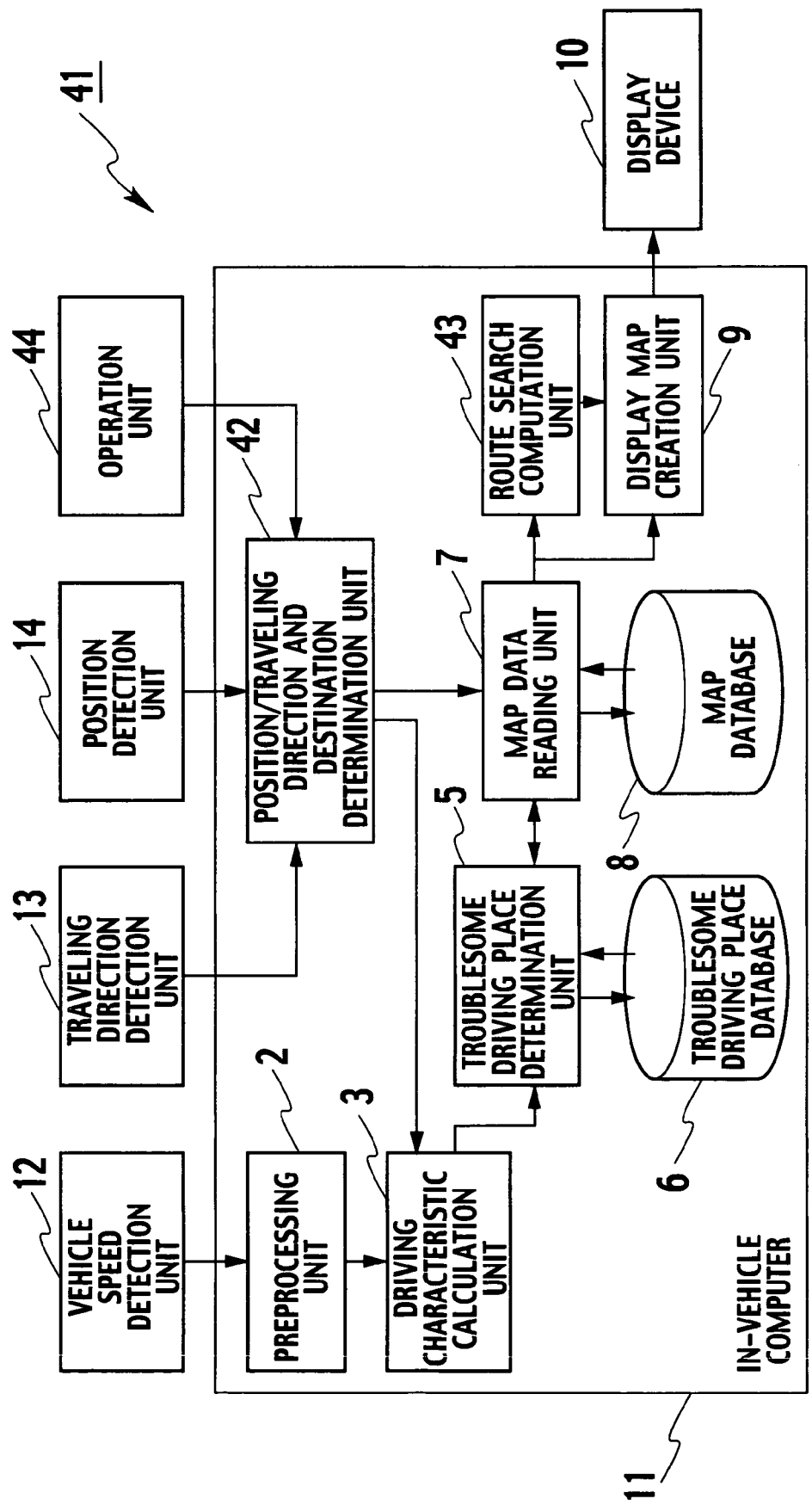
FIG. 10 is a block diagram showing a configuration of a navigation system as a third embodiment of the present invention.
Figure 11:
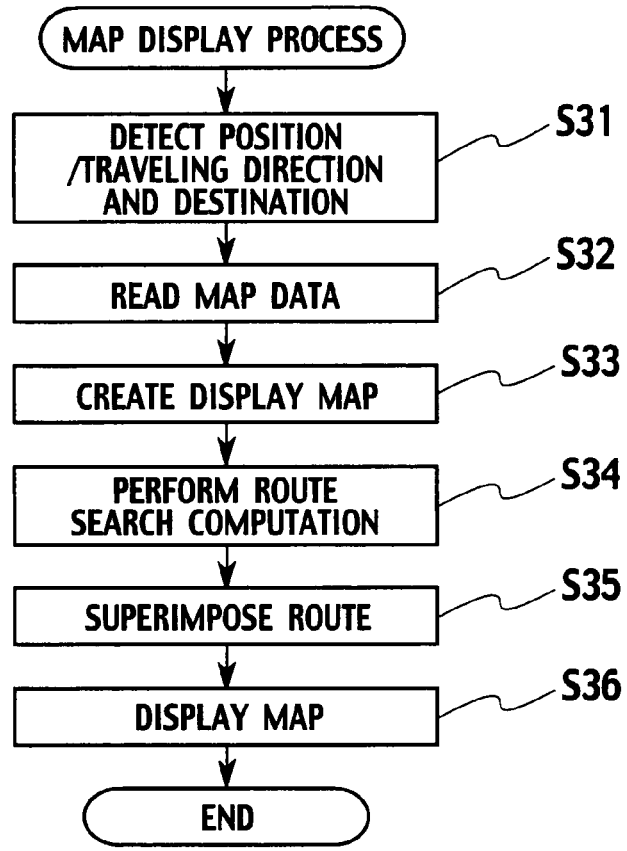
FIG. 11 is a flowchart showing a flow of a map display process as the third embodiment of the present invention.
Figure 12:
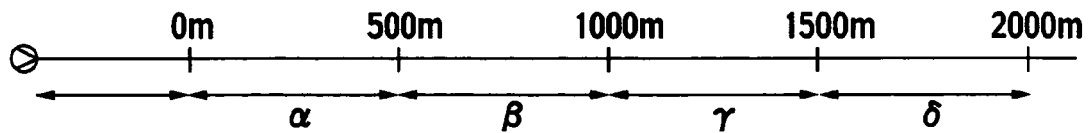
FIG. 12 is a view for illustrating a process to change a weight for a link cost according to size of the risk cost.

Next, a description is given of a configuration and an action of a navigation system as a third embodiment of the present invention with reference to FIGS. 10 to 12.

A navigation system 41 as the third embodiment of the present invention, as shown in FIG. 10, includes the preprocessing unit 2, the driving characteristic calculation unit 3, the troublesome driving place determination unit 5, the troublesome driving place database 6, the map data reading unit 7, the map database 8, the display map creation unit 9, a position/traveling direction and destination determination unit 42, and a route search computation unit 43 as the main components. The navigation system 41 is configured to search a route to a destination under the condition that the risk cost is minimized in response to the driver ordering the route guidance by means of an operation unit 44. The operation unit 44 is composed of a joystick, a touch panel, or the like. Each of the components of the preprocessing unit 2, the driving characteristic calculation unit 3, the troublesome driving place determination unit 5, the map data reading unit 7, the display map creation unit 9, the position/traveling direction and destination determination unit 42, and the route search computation unit 43 is implemented by the in-vehicle computer 11 executing a computer program defining the later-described function (action) of the component.

The navigation system 41 having the aforementioned configuration operates as follows to search a route to a destination under the condition that the risk cost is minimized. Hereinafter, a detailed description is given of an action of the navigation system 41 executing the map display process with reference to a flowchart of FIG. 11. The risk cost calculation process of the navigation system 41 as the third embodiment of the present invention is the same as that of the first embodiment, and the description thereof is omitted.

The flowchart shown in FIG. 11 starts upon the driver operating the operation unit 44 to set a destination and order search for a route to the set destination, and the display process proceeds to a process of step S31.

In the process of the step S31, the position/traveling direction and destination determination unit 42 detects information of the current position and traveling direction of the vehicle and the position of the destination set by the driver through the traveling direction detection unit 13, position detection unit 14, and operation unit 44. The process of the step S31 is thus completed, and the display process proceeds from the process of the step S31 to a process of step S32.

In the process of the step S32, the map data reading unit 7 reads map data corresponding to the current position and traveling direction of the vehicle detected by the process of the step S31 from the map database 8. The process of the step S32 is thus completed, and the display process proceeds from the process of the step S32 to a process of step S33.

In the process of the step S33, the display map creation unit 9 creates a map screen showing information of the current position of the vehicle and map information around the vehicle using the map data read by the process of the step S32. The process of the step S33 is thus completed, and the display process proceeds from the process of the step S33 to a process of step S34.

In the process of the step S34, the route search computation unit 43 searches for a route from the current position to the destination using a route search method such as the Dijkstra algorithm with reference to the map database 8. In the process, the route search computation unit 43 sets a larger weight for a link cost of a link including an intersection with a higher risk cost with reference to the troublesome driving place database 6 so as to search for a route having a minimum risk cost to the destination. Specifically, as shown in FIG. 12, when all weights $\alpha$, $\beta$, $\gamma$, and $\delta$ for the link costs of ranges from 0 to 500, 500 to 1000, 1000 to 1500, and 1500 to 2000 m from the current position are 1, in the case where an intersection with a high risk cost is within the range from 1000 to 1500 m, the route search computation unit 43 changes the weight $\gamma$ for the link cost in the range from 1000 to 1500 m from 1 to 5. The process of the step S34 is thus completed, and the display process proceeds from the process of the step S34 to a process of step S35.

In the process of the step S35, the display map creation unit 9 superimposes the route found by the process of the step S34 on the map screen created by the process of the step S33. The process of the step S35 is thus completed, and the display process proceeds from the process of the step S35 to a process of step S36.

In the process of the step S36, the display map creation unit 9 displays the map screen with the route from the current position to the destination superimposed thereon on the display device 10. The process of the step S36 is thus completed, and the series of steps of the display process is terminated.

As apparent from the above description, according to the navigation system 41 as the third embodiment of the present invention, the route search computation unit 43 searches for a route to the destination under the condition that the risk cost is minimized with reference to the troublesome driving place database 6. Accordingly, the driver can reach the desired destination through a route with a low risk cost, in other words, with a low troublesome degree.

Figure 13:
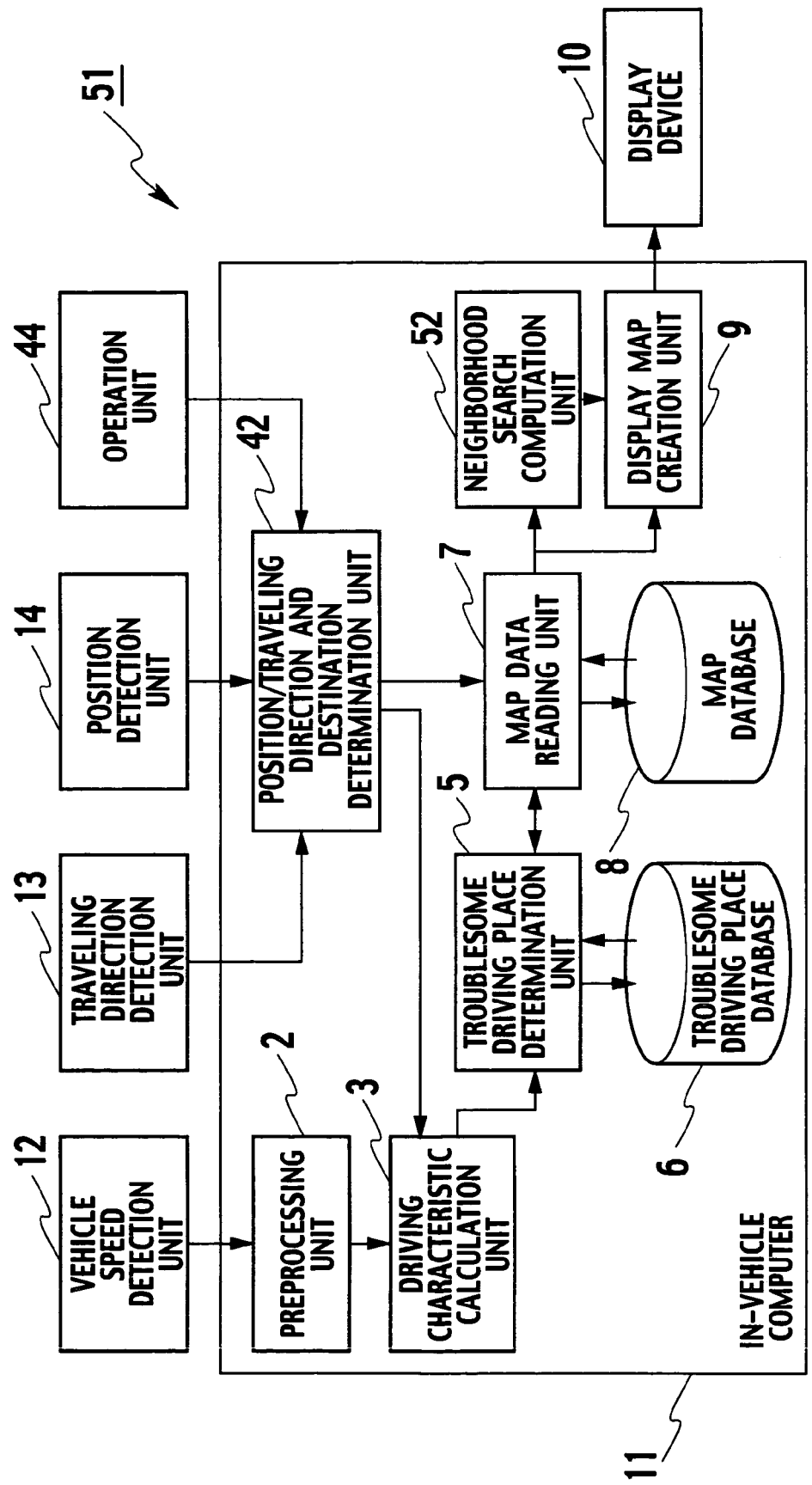
FIG. 13 is a block diagram showing a configuration of a navigation system as a fourth embodiment of the present invention.
Figure 14:
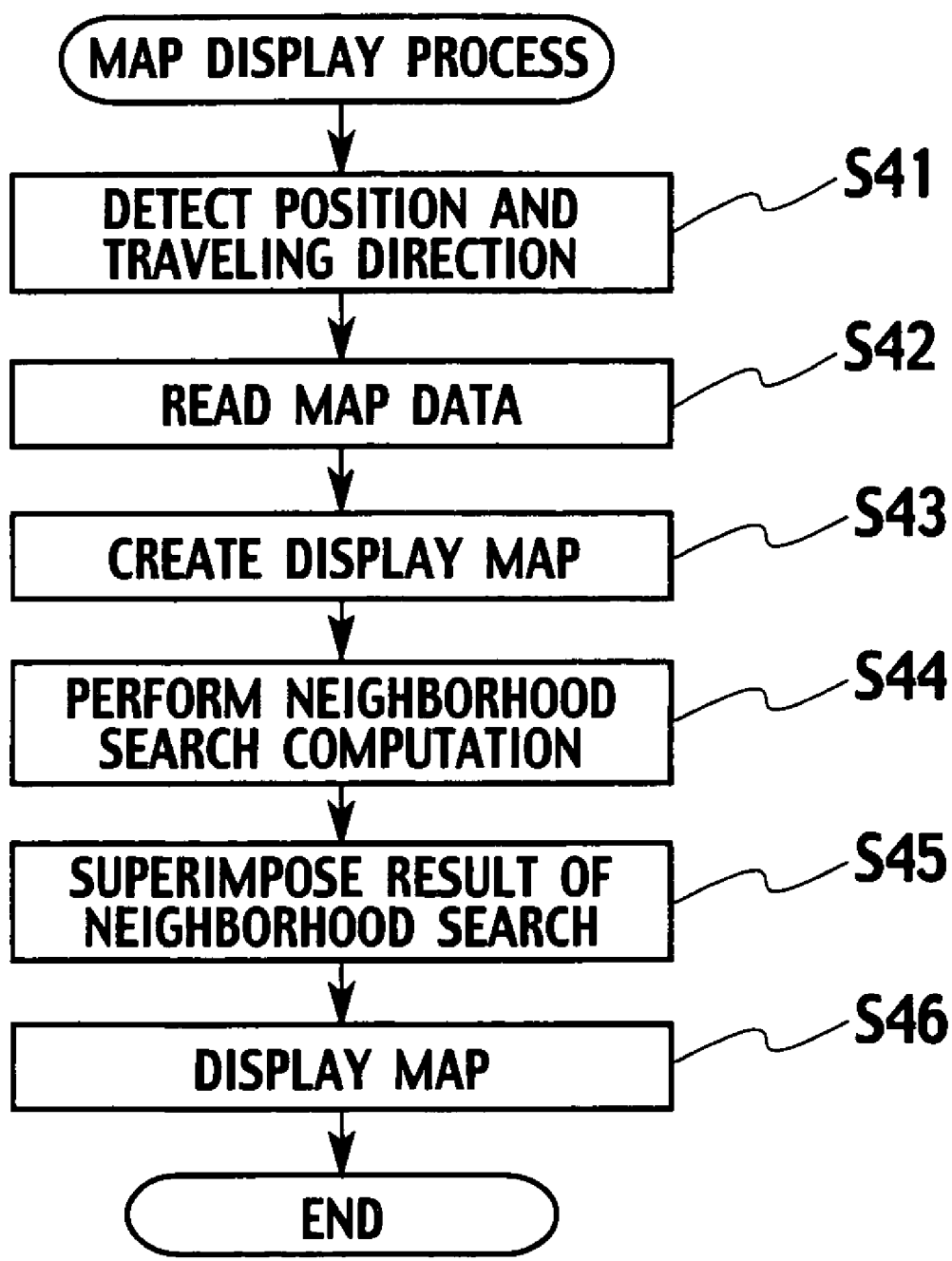
FIG. 14 is a flowchart showing a flow of a map display process as the fourth embodiment of the present invention.

Next, a description is given of a configuration and an action of a navigation system as a fourth embodiment of the present invention with reference to FIGS. 13 and 14.

A navigation system 51 as the fourth embodiment of the present invention includes, as shown in FIG. 13, includes the preprocessing unit 2, the driving characteristic calculation unit 3, the troublesome driving place determination unit 5, the troublesome driving place database 6, the map data reading unit 7, the map database 8, the display map creation unit 9, the position/traveling direction and destination determination unit 42, and a neighborhood search computation unit 52 as main components. The navigation system 51 is configured to search for facilities around the vehicle under the condition that the risk cost to each facility is minimized in response to the driver ordering retrieval of facilities around the vehicle by means of the operation unit 44. Each of the components of the preprocessing unit 2, the driving characteristic calculation unit 3, the troublesome driving place determination unit 5, the map data reading unit 7, the display map creation unit 9, the position/traveling direction and destination determination unit 42, and the neighborhood search computation unit 52 is implemented by the in-vehicle computer 11 executing a computer program defining a function (action) of the component.

The navigation system 51 having the above configuration operates as follows to search for facilities around the vehicle under the condition that the risk cost to each facility is minimized. Hereinafter, a detailed description is given of an action of the navigation system 51 executing the map display process with reference to a flowchart shown in FIG. 14. The risk cost calculation process of the navigation system 51 as the fourth embodiment is the same as that of the first embodiment, and the description thereof is omitted.

The flowchart shown in FIG. 14 starts upon the driver operating the operation unit 44 to order search for facilities around the vehicle, and the display process proceeds to a process of step S41.

In the process of the step S41, the position/traveling direction and destination determination unit 42 detects the current position and traveling direction of the vehicle through the traveling direction detection unit 13 and position detection unit 14. The process of the step S41 is thus completed, and the display process proceeds from the process of the step S41 to a process of step S42.

In the process of the step S42, the map data reading unit 7 reads map data corresponding to the current position and traveling direction of the vehicle detected by the process of the step S41 from the map database 8. The process of the step S42 is thus completed, and the display process proceeds from the process of the step S42 to a process of step S43.

In the process of the step S43, the display map creation unit 9 creates a map screen showing information of the current position of the vehicle and map information around the vehicle using the map data read by the process of the step S42. The process of the step S43 is thus completed, and the display process proceeds from the process of the step S43 to a process of step S44.

In the process of the step S44, the neighborhood search computation unit 52 retrieves facilities around the vehicle with reference to the map database 8 and searches for a route from the current position to each facility using a route search method such as the Dijkstra algorithm. In the process, the neighborhood search computation unit 52 sets a larger weight for a link cost of a link including an intersection with a higher risk cost with reference to the troublesome driving place database 6 so as to search for a route with a minimum risk cost to each facility. The process of the step S44 is thus completed, and the display process proceeds from the process of the step S44 to a process of step S45.

In the process of the step S45, the display map creation unit 9 superimposes the routes found by the process of the step S44 on the map screen created by the process of the step S43. The process of the step S45 is thus completed, and the display process proceeds from the process of the step S45 to a process of step S46.

In the process of the step S46, the display map creation unit 9 displays the map screen with the routes from the current position to the neighboring facilities superimposed thereon on the display device 10. In the process, the display map creation unit 9 may display a list of the searched facilities on the display device 10. The process of the step S46 is thus completed, and the series of steps of the display process is terminated.

As apparent from the above description, according to the navigation system 51 as the fourth embodiment of the present invention, the neighborhood search computation unit 52 retrieves facilities around the vehicle under the condition that the risk cost to each facility is minimized with reference to the troublesome driving place database 6. Accordingly, the driver can reach each facility around the vehicle through a route with a low risk cost, in other words, with a low troublesome degree.

Next, a description is given of a configuration and an action of a navigation system as a fifth embodiment of the present invention.

Figure 15:
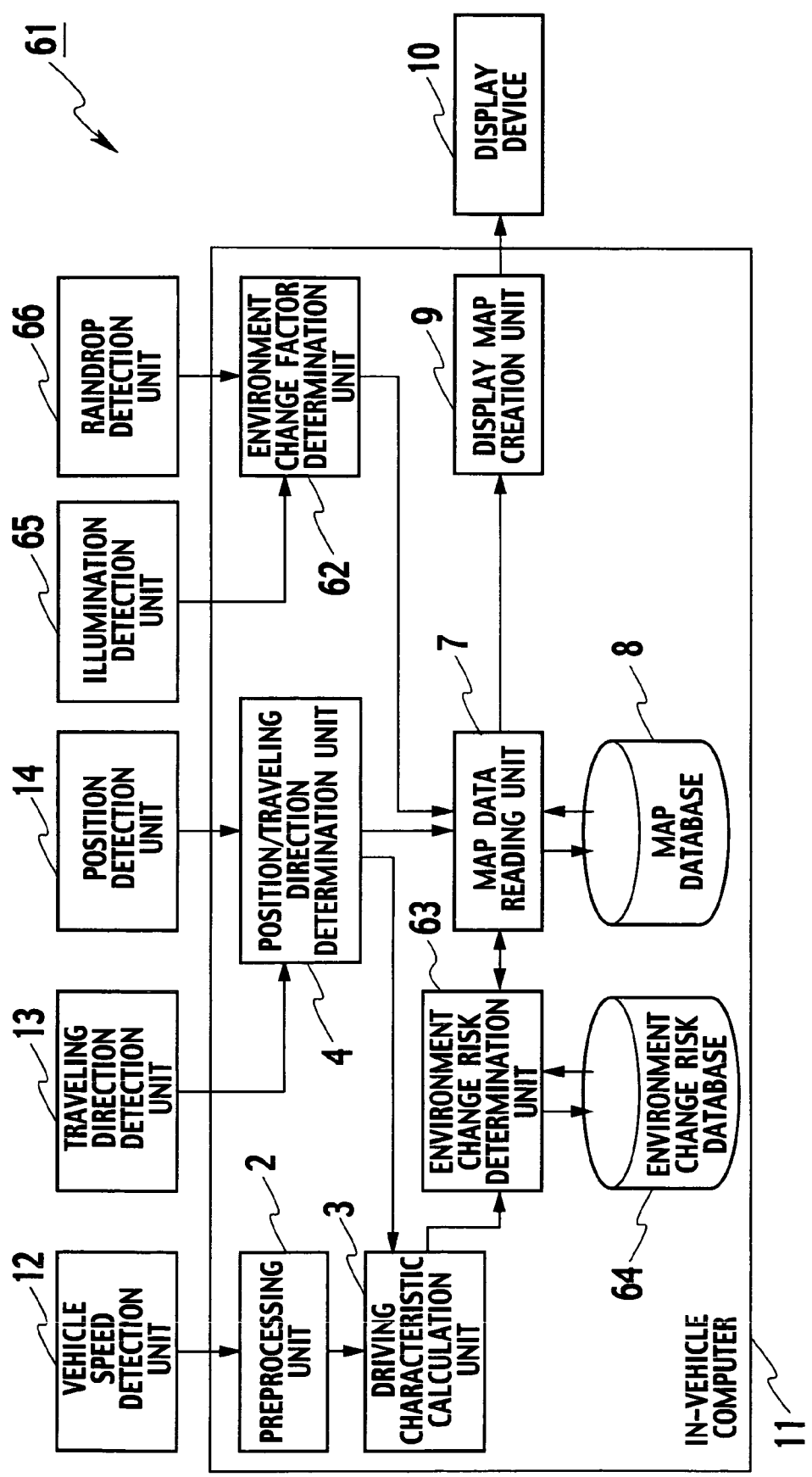
FIG. 15 is a block diagram showing a configuration of a navigation system as a fifth embodiment of the present invention.

A navigation system 61 as the fifth embodiment of the present invention includes, as shown in FIG. 15, includes the preprocessing unit 2, the driving characteristic calculation unit 3, the position/traveling direction determination unit 4, the map data reading unit 7, the map database 8, the display map creation unit 9, an environmental change factor determination unit 62, an environmental change risk determination unit 63, and an environmental change risk database 64 as main components. The navigation system 61 is configured to display map information on the display device 10 such as a liquid crystal display to perform route guidance for the vehicle.

Each of the components of the preprocessing unit 2, the driving characteristic calculation unit 3, the position/traveling direction determination unit 4, the map data reading unit 7, the display map creation unit 9, the environmental change factor determination unit 62, and the environmental change risk determination unit 63 is implemented by the in-vehicle computer 11 executing a computer program defining a function (action) of the component. The environmental change risk database 64 and map database 8 are stored in the memory within the in-vehicle computer 11 or a storage medium such as CD-ROM and are read when used.

The in-vehicle computer 11 is connected to the vehicle speed detection unit 12, the traveling direction detection unit 13, a position detection unit 14 detecting a position of the vehicle by use of radio signals emitted from a GPS satellite, an illumination detection unit 65 such as an illumination sensor detecting illumination outside the vehicle, and a raindrop detection unit 66 detecting a rainfall outside the vehicle such as a raindrop sensor.

The environmental change risk database 64 stores the risk costs of the driver to an environment (environmental change factor) outside the vehicle for each traveling situation (driver's driving action) of the vehicle, as described in detail later. In this specification, the "risk cost" indicates a troublesome degree of the driver, and a larger risk cost for an environment means that the driver's driving is poorer at the traveling situation under the environment.

The navigation system 61 having the above configuration executes a risk cost calculation process and a map display process shown below to calculate the risk costs of the driver to environmental change factors outside the vehicle for each traveling situation and perform route guidance using the calculated risk costs. Hereinafter, a detailed description is given of an action of the navigation system 61 executing the risk cost calculation process and map display process with reference to flowcharts of FIGS. 16 and 18.

First, the action of the navigation system 61 executing the risk cost calculation process to calculate the risk costs of the driver to the environmental change factors outside the vehicle is described in detail with reference to the flowchart shown in FIG. 16.

Figure 16:
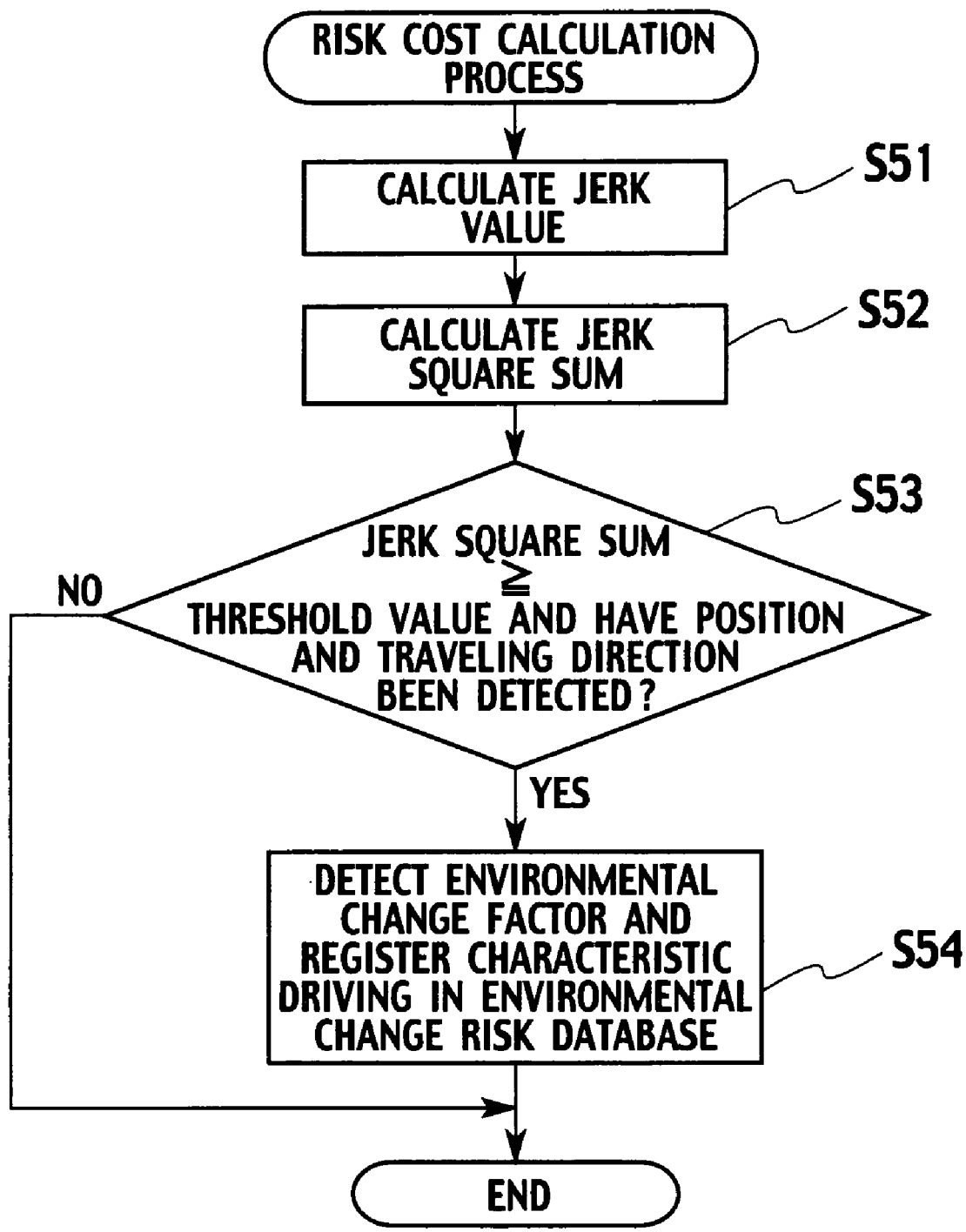
FIG. 16 is a flowchart showing a flow of a risk cost calculation process as the fifth embodiment of the present invention.

The flowchart shown in FIG. 16 starts upon the power supply to the navigation system 61 being turned on, and the calculation process proceeds to a process of step S51. The calculation process is repeatedly executed each time the vehicle comes into the following traveling situations.

In the process of the step S51, the preprocessing unit 2 detects the vehicle speed V through the vehicle speed detection unit 12 and calculates the second-order differential value (hereinafter, referred to as jerk) J of the detected vehicle speed V using the aforementioned equation (1). The process of the step S51 is thus completed, and the calculation process proceeds from the process of the strep S51 to a process of step S52.

In the process of step S52, the preprocessing unit 2 calculates square value $J^2$ (or absolute value $|J|$) of the calculated jerk J and assigns the calculated square value $J^2$ to the aforementioned equation (2), thus calculating a jerk square sum $SJ(t_n)$ at a time $t_n$. The process of the step S52 is thus completed, and the calculation process proceeds from the step S52 to a process of step S53.

In the process of the step S53, the driving characteristic calculation unit 3 determines whether the square sum $SJ(t_n)$ of the jerk J calculated by the process of the step S52 is equal to or above the predetermined threshold value and the position/traveling direction determination unit 4 has detected the current position and traveling direction of the vehicle. As a result of the judgment, when the square sum $SJ(t_n)$ of the jerk J is equal to or above the predetermined threshold value and the position/traveling direction determination unit 4 has detected the current position and traveling direction of the vehicle, the driving characteristic calculation unit 3 determines that the driver's personal characteristic driving is detected and advances the calculation process to a process of step S54.

On the other hand, in the other cases, the driving characteristic calculation unit 3 terminates the series of steps of the calculation process. In the specification, the "characteristic driving" means the environmental change factor and traveling situation of the vehicle when the jerk square sum $SJ(t_n)$ is calculated to be equal to or above the predetermined threshold value. In this embodiment, the environmental change factor is described by the rainfall and illumination outside the vehicle, and the traveling situation of the vehicle is described by the position and traveling direction of the vehicle.

In the process of the step S54, the map data reading unit 7 reads map information corresponding to the current position and traveling direction of the vehicle detected by the position/traveling direction determination unit 4 from the map database 8. The environmental change factor determination unit 62 detects the environmental change factor when the jerk square sum $SJ(t_n)$ is calculated to be equal to or above the predetermined threshold value. The environmental change risk determination unit 63 records information of the environmental change factor and information of the traveling situation of the vehicle when the jerk square sum $SJ(t_n)$ is calculated to be equal to or above the predetermined threshold value in association with each other as information of the characteristic driving in the environmental change risk database 64.

More specifically, in this embodiment, the environmental change risk determination unit 63 stores a table shown in FIG. 17 in the environmental change risk database 64. In the table, seven traveling situations of the vehicle are assigned to horizontal rows, and five environmental change factors are assigned to vertical columns. Herein, the seven traveling situations are turning right at an intersection, turning left at an intersection, going straight at an intersection, traveling in a gentle curve, traveling in a sharp curve, traveling in a narrow road, and traveling in a side road. The five environmental change factors are base, cloudy-bright, rainy-bright, cloudy-dark, and rainy-dark. The environmental change risk determination unit 63 records the date when the jerk square sum $SJ(t_n)$ is calculated to be equal to or above the predetermined threshold value in a field corresponding to the traveling situation and environmental change factor at that time as the information of the characteristic driving.

When the information of the characteristic driving is recorded in the environmental change risk database 64, the environmental change factor risk determination unit 63 tallies the number of dates recorded for each field, thus calculating the risk costs of the driver to the environmental change factors for each traveling situation of the vehicle. Specifically, in the table shown in FIG. 17, the number of dates recorded in the field in which the traveling situation of the vehicle and the environmental change factor are "turning right at an intersection" and "rainy-dark", respectively, is 2. The environmental change risk determination unit 63 therefore obtains 2 as the risk cost in the case where the driver turns right at an intersection when it is dark and raining outside the vehicle. The environmental change risk determination unit 63 determines that the driver is poor at the driving operation of turning right at an intersection when it is dark and raining outside the vehicle.

In this embodiment, the environmental change risk determination unit 63 calculates the risk costs by tallying the cumulative number of dates recorded. However, the risk costs of the driver can be calculated by calculating the cumulative value of the jerk square sum $SJ(t_n)$ equal to or above the predetermined threshold value, a value obtained by dividing the cumulative number of dates recorded or the cumulative value of the jerk square sum $SJ(t_n)$ by the number of times that the vehicle has passed an intersection, a curve, or a road link of interest, and a maximum value of the jerk square sum $SJ(t_n)$ and using the calculated value. The process of the step S54 is thus completed, and the series of steps of the risk cost calculation process is terminated.

Next, a description is given of an action of the navigation system 61 executing the map display process using the risk costs calculated as described above with reference to a flowchart of FIG. 18.

Figure 18:
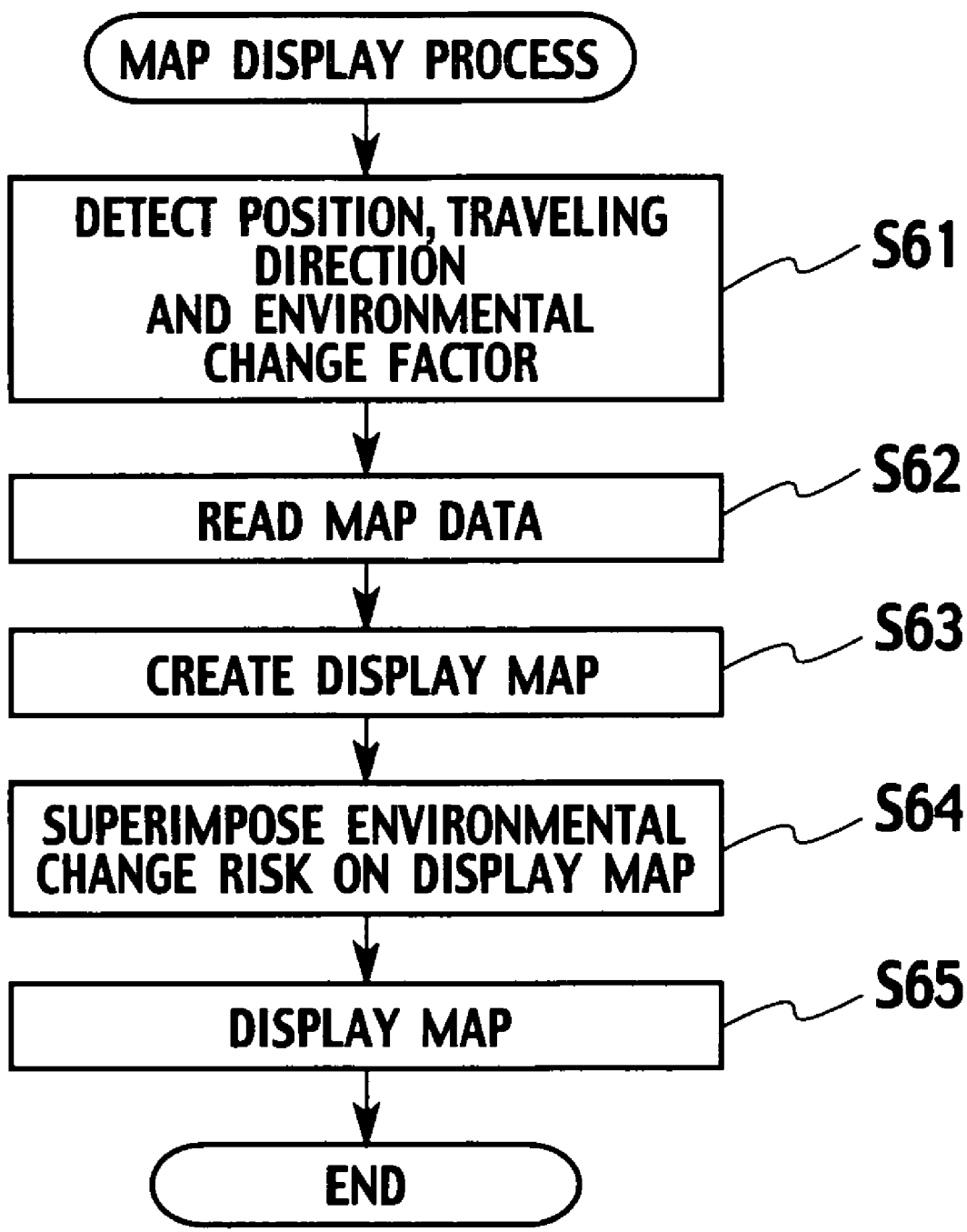
FIG. 18 is a flowchart showing a flow of a map display process as the fifth embodiment of the present invention.

The flowchart shown in FIG. 18 starts upon the driver operating the navigation system 61 to order the route guidance, and the display process proceeds to a process of step S61.

In the process of the step S61, the position/traveling direction determination unit 4 detects the current position and traveling direction of the vehicle as the current traveling situation through the traveling direction detection unit 13 and position detection unit 14. The environmental change factor determination unit 62 detects the current environmental change factor. The process of the step S61 is thus completed, and the display process proceeds from the process of the step S61 to a process of step S62.

In the process of the step S62, the map data reading unit 7 reads map data corresponding to the current position and traveling direction of the vehicle detected by the process of the step S61 from the map database 8. The process of the step S62 is thus completed, and the display process proceeds from the process of the step S62 to a process of step S63.

In the process of the step S63, the display map creation unit 9 creates a map screen showing information of the current position of the vehicle and map information around the vehicle using the map data read by the process of the step S62. The process of the step S63 is thus completed, and the display process proceeds from the process of the step S63 to a process of step S64.

In the process of the step S64, the map data reading unit 7 reads the risk cost of each traveling situation under the current environment from the environmental change risk database 64 through the environmental change risk determination unit 63. The display map creation unit 9 superimposes the read risk costs at positions corresponding to the individual traveling situations within the map screen. The process of the step S64 is thus completed, and the display process proceeds from the process of the step S64 to a process of step S65.

Figure 19:
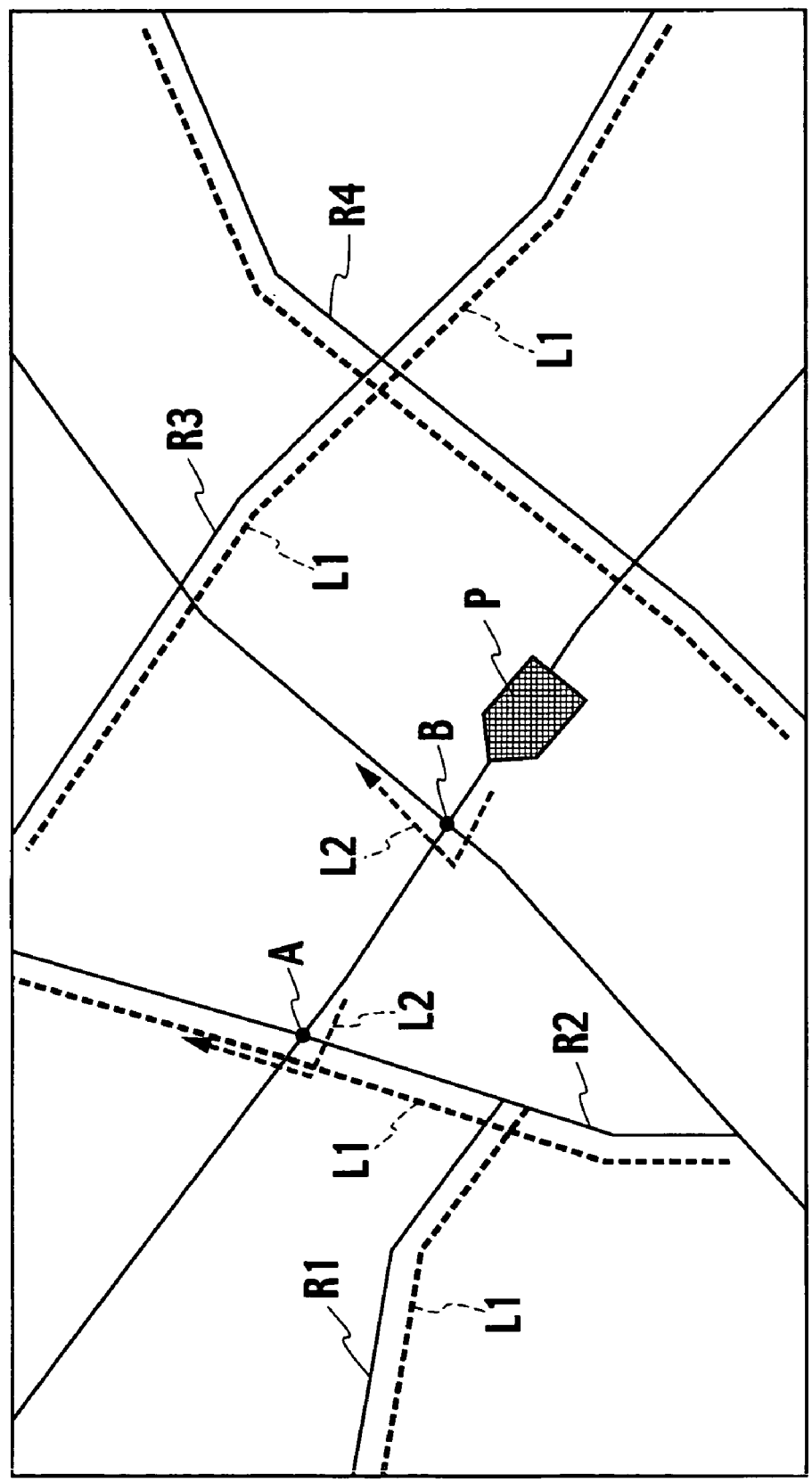
FIG. 19 is a view showing risk costs superimposed on a map screen.

In the process of the step S65, the display map creation unit 9 displays the map screen with the risk costs superimposed thereon on the display device 10. Specifically, as shown in FIG. 19, the display map creation unit 9 displays the current position P of the vehicle and the positions and traveling directions with the risk costs of 1 and 2 with dashed lines L1 and L2, respectively. In the example shown in FIG. 19, the dashed lines L1 and L2 indicate that the driver is poor at the operation of driving straight on roads R1, R2, R3, and R4 when it is dark and raining outside the vehicle (the risk cost is 1) and that the driver is poor at the operation of turning right at intersections A and B when it is dark and raining outside the vehicle (the risk cost is 2). The process of the step S65 is thus completed, and the series of steps of the display process is terminated.

As apparent from the above description, according to the navigation system 61 as the fifth embodiment of the present invention, the preprocessing unit 2 calculates the jerk square sum $SJ(t_n)$, and the driving characteristic calculation unit 3 determines whether the jerk square sum $SJ(t_n)$ is equal to or above the predetermined threshold value. The position/traveling direction determination unit 4 determines the traveling situation of the vehicle, and the environmental change factor determination unit 62 determines the environmental change factor outside the vehicle.

The environmental change risk determination unit 63 then records the information of the traveling situation and the information of the environmental change factor when the jerk square sum $SJ(t_n)$ is calculated to be equal to or above the predetermined threshold value in association with each other in the environmental change risk database 64. The environmental change risk determination unit 63 then calculates the risk costs of the driver to the environmental change factors for each traveling situation with reference to the environmental change risk database 64. It is therefore possible to perform the route guidance taking the risk of the driver to the environmental change factors into an account.

Moreover, according to the navigation system 61 as the fifth embodiment of the present invention, the display map creation unit 9 displays the map information around the vehicle on the display device 10, and the environmental change risk determination unit 63 superimposes the calculated risk costs on the map screen. The driver can therefore check the traveling situation with a high risk cost, in other words, the traveling situation with a high troublesome degree.

Figure 20:
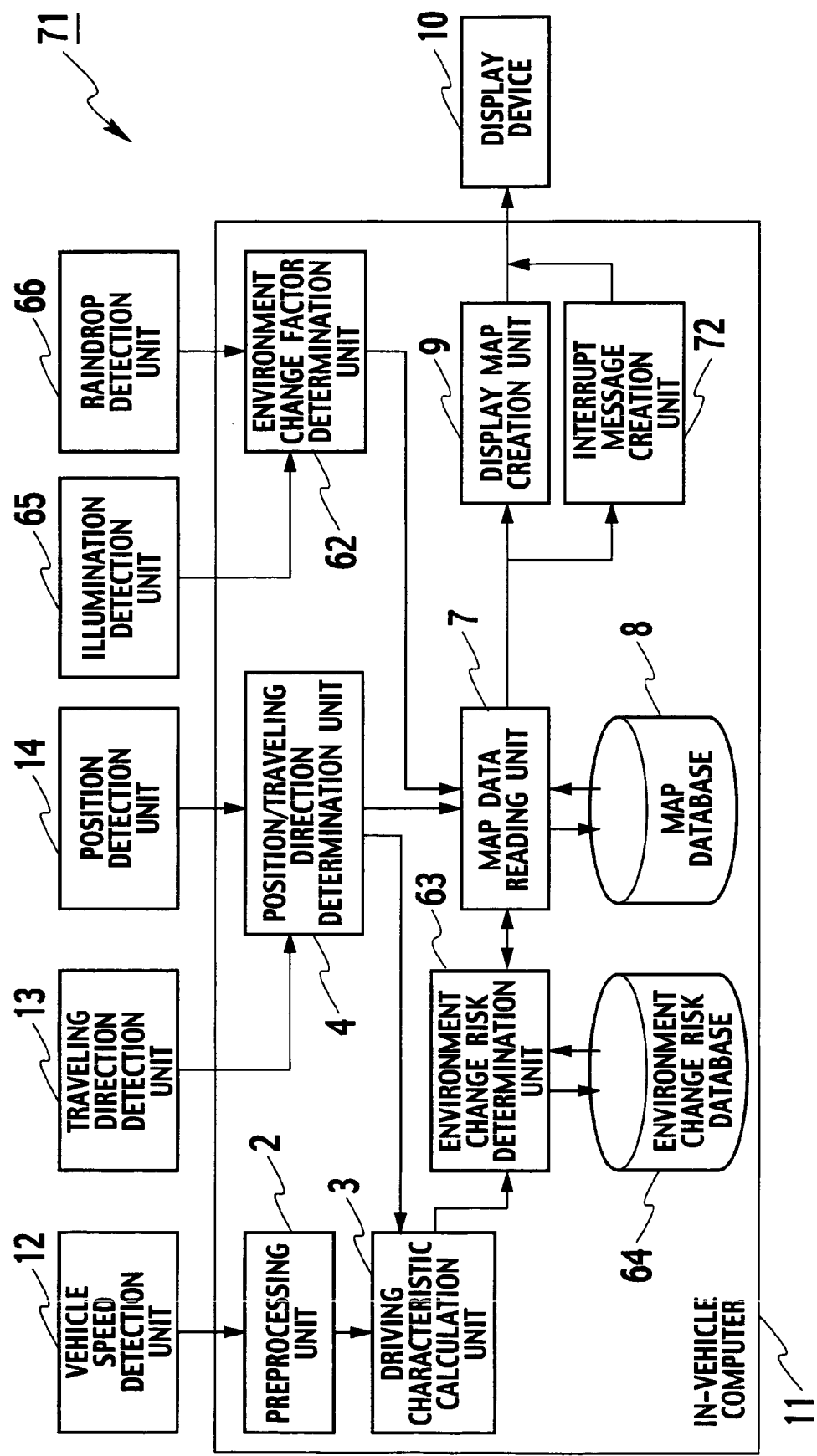
FIG. 20 is a block diagram showing a configuration of a navigation system of a sixth embodiment of the present invention.
Figure 21:
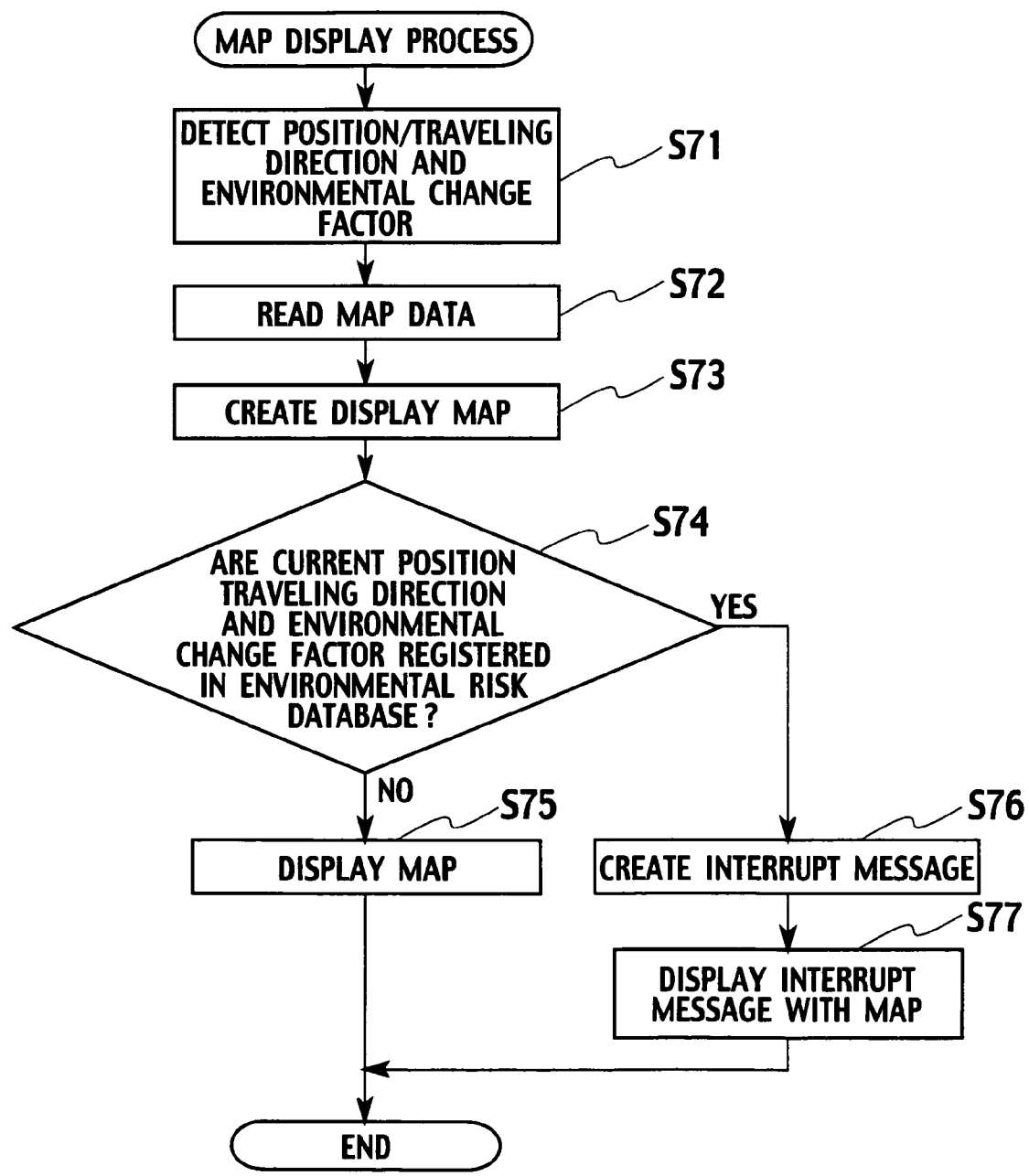
FIG. 21 is a flowchart showing a flow of a map display process as the sixth embodiment of the present invention.

Next, a description is given of a configuration and an action of a navigation system as the sixth embodiment of the present invention with reference to FIGS. 20 and 21.

A navigation system 71 as the sixth embodiment of the present invention includes, as shown in FIG. 20, the preprocessing unit 2, the driving characteristic calculation unit 3, the position/traveling direction determination unit 4, the map data reading unit 7, the map database 8, the display map creation unit 9, the environmental change factor determination unit 62, the environmental change risk determination unit 63, the environmental change risk database 64, and an interrupt message creation unit 72 as main components. The navigation system 71 is configured to display a message urging the driver to drive safely on the display device 10 when the vehicle comes into the traveling situation with a higher risk cost. Each of the components including the preprocessing unit 2, the driving characteristic calculation unit 3, the position/traveling direction determination unit 4, the map data reading unit 7, the display map creation unit 9, the environmental change factor determination unit 62, the environmental change risk determination unit 63, and an interrupt message creation unit 72 is implemented by the in-vehicle computer 11 executing a computer program defining an function (action) of the component.

The navigation system 71 having the above configuration executes a map display process shown below to display the message urging the driver to drive safely on the display device 10 when the vehicle comes into the traveling situation with a higher risk cost. Hereinafter, a detailed description is given of the action of the navigation system 71 executing the map display process with reference to a flowchart shown in FIG. 21. The risk cost process in the navigation system 71 as the sixth embodiment is the same as that of the above fifth embodiment, and the description thereof is omitted.

The flowchart shown in FIG. 21 starts upon the driver operating the navigation system 71 to order the route guidance, and the display process proceeds to a process of step S71.

In the process of the step S71, the position/traveling direction determination unit 4 detects the current position and traveling direction of the vehicle as the current traveling situation through the traveling direction detection unit 13 and position detection unit 14. The environmental change factor determination unit 62 extracts the current environmental change factor through the illumination detection unit 65 and raindrop detection unit 66. The process of the step S71 is thus completed, and the display process proceeds from the process of the step S71 to a process of step S72.

In the process of the step S72, the map data reading unit 7 reads map data corresponding to the current position and traveling direction of the vehicle detected by the process of the step S71 from the map database 8. The process of the step S72 is thus completed, and the display process proceeds from the step S72 to a process of step S73.

In the process of the step S73, the display map creation unit 9 creates a map screen showing information of the current position of the vehicle and map information around the vehicle using the map data read by the process of the step S72. The process of the step S73 is thus completed, and the display process proceeds from the process of the step S73 to a process of step S74.

In the process of the step S74, the map data reading unit 7 determines whether a combination of the current traveling situation and environmental change factor of the vehicle matches any one of the combinations of the traveling situations and environmental change factors which are high in risk costs and stored in the environmental change risk database 64. As a result of the determination, when the combination of the current traveling situation and environmental change factor of the vehicle matches any one of the combinations of the traveling situations and environmental change factors stored in the environmental change risk database 64, the map data reading unit 7 advances the display process from the process of the step S74 to a process of step S76. In other cases, the map data reading unit 7 advances the display process from the process of the step S74 to a process of step S75.

In the process of the step S75, the display map creation unit 9 displays the map screen created by the process of the step S73 on the display device 10. The process of the step S75 is thus completed, and the series of steps of the display process is terminated.

In the process of the step S76, the interrupt message creation unit 72 creates a message promoting safe driving. The process of the step S76 is thus completed, and the display process proceeds from the process of the step S76 to a process of step S77.

In the process of the step S77, the display map creation unit 9 displays the map screen created by the process of the step S73, and the interrupt message creation unit 72 displays the message created by the process of the step S76 as the interrupt message. The process of the step S77 is thus completed, and the series of steps of the display process is terminated.

As apparent from the above description, in the navigation system 71 as the sixth embodiment of the present invention, the interrupt message creation unit 72 displays the message urging the driver to drive safely on the display device 10 in response to the vehicle coming into the traveling situation with a high risk cost for the driver. Accordingly, it is possible to alert the driver during driving under an environment with a high risk cost.

Figure 22:
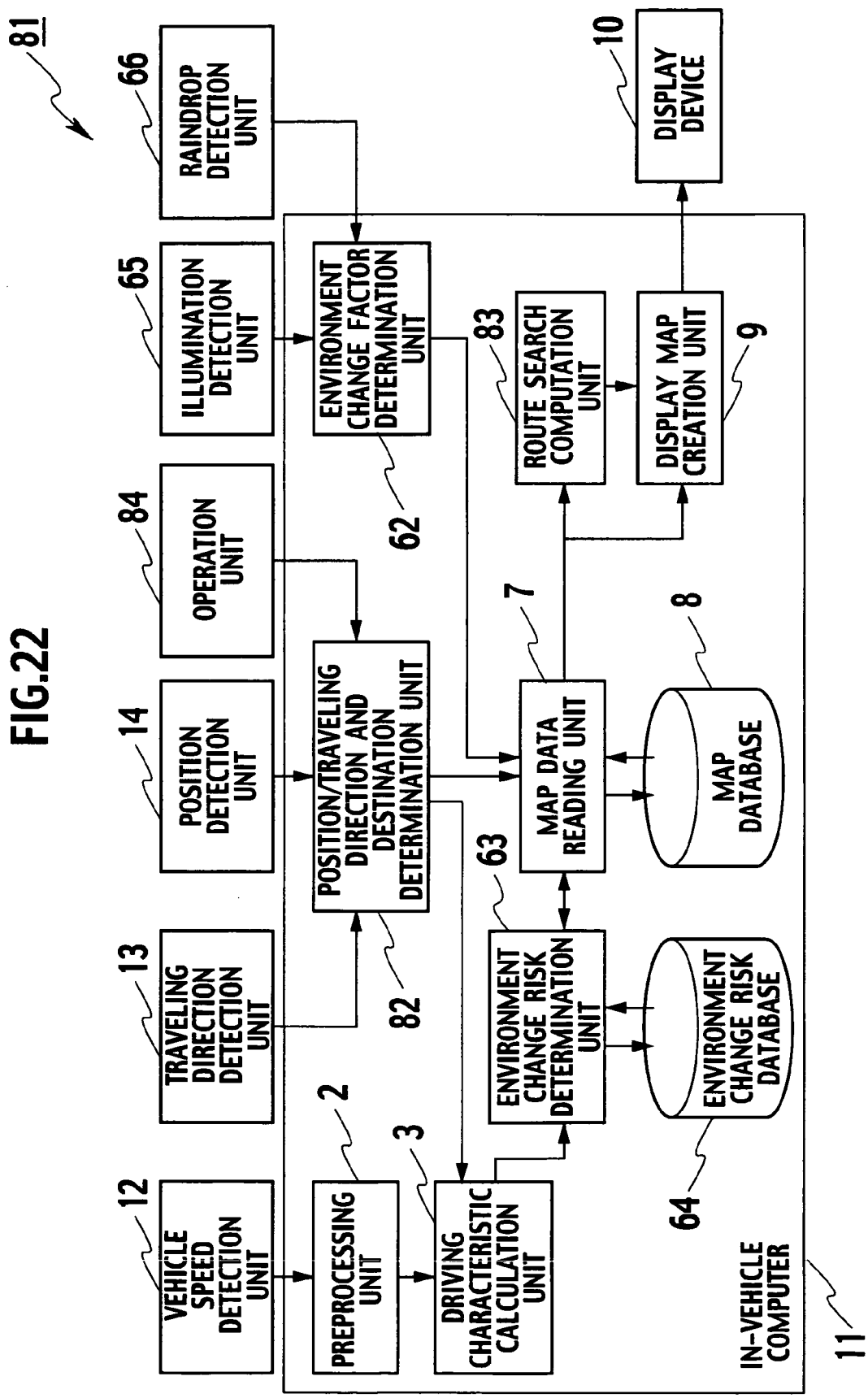
FIG. 22 is a block diagram showing a configuration of a navigation system as a seventh embodiment of the present invention.

Next, a description is given of a configuration and an action of a navigation system as a seventh embodiment of the present invention with reference to FIGS. 22 and 23.

A navigation system 81 as the seventh embodiment of the present invention includes, as shown in FIG. 22, the preprocessing unit 2, the driving characteristic calculation unit 3, the map data reading unit 7, the map database 8, the display map creation unit 9, the environmental change factor determination unit 62, the environmental change risk determination unit 63, the environmental change risk database 64, a position/traveling direction and destination determination unit 82, and a route search computation unit 83 as the main components. The navigation system 81 is configured to search a route to a destination under the condition that the risk cost is minimized upon the driver ordering route search to the destination by means of an operation unit 84. The operation unit 84 is composed of a joystick, a touch panel, or the like. Each of the components including the preprocessing unit 2, the driving characteristic calculation unit 3, the map data reading unit 7, the display map creation unit 9, the environmental change factor determination unit 62, the environmental change risk determination unit 63, the position/traveling direction and destination determination unit 82, and the route search computation unit 83 is implemented by the in-vehicle computer 11 executing a computer program defining a function (action) of the component.

The navigation system 81 having the above configuration operates as follows to search for a route to the destination under the condition that the risk cost is minimized. Hereinafter, a detailed description is given of the action of the navigation system 81 executing a map display process with reference to a flowchart shown in FIG. 23. A risk cost process in the navigation system 81 as the seventh embodiment is the same as that of the above fifth embodiment, and the description thereof is omitted.

The flowchart shown in FIG. 23 starts upon the driver operating the operation unit 84 to set a destination and order the route guidance to the destination, and the display process proceeds to a process of step S81.

In the process of the step S81, the position/traveling direction and destination determination unit 82 detects the current position and traveling direction of the vehicle and the position of the set destination through the traveling direction detection unit 13, position detection unit 14, and the operation unit 84. The environmental change factor determination unit 62 extracts the current environmental change factor through the illumination detection unit 65 and raindrop detection unit 66. The process of the step S81 is thus completed, and the display process proceeds from the process of the step S81 to a process of step S82.

In the process of the step S82, the map data reading unit 7 reads map data corresponding to the current position and traveling direction of the vehicle detected by the process of the step S81 from the map database 8. The process of the step S82 is thus completed, and the display process proceeds from the process of the step S82 to a process of step S83.

In the process of the step S83, the display map creation unit 9 creates a map screen showing information of the current position of the vehicle and map information around the vehicle using the map data read by the process of the step S82. The process of the step S83 is thus completed, and the display process proceeds from the process of the step S83 to a process of the step S84.

In the process of the step S84, the route search computation unit 83 searches for a route from the current position to the destination using a route search method such as the Dijkstra algorithm with reference to the map database 8. In the process, the route search computation unit 83 sets a larger weight for a link cost of a link including a traveling situation with a higher risk cost in the current environmental change factor with reference to the environmental change risk database 64 so as to search for a route minimizing the risk cost to the destination.

Specifically, as shown in FIG. 24, when all the weights α, β, γ, and δ for link costs of ranges from 0 to 500, 500 to 1000, 1000 to 1500, and 1500 to 2000 m from the current position are 1, in the case where the traveling situation with a high risk cost to the current environmental change factor is included in the range from 1000 to 1500 m, the route search computation unit 83 changes the weight 7 for the link cost of the range from 1000 to 1500 m from 1 to 5. The process of the step S84 is thus completed, and the display process proceeds from the process of the step S84 to a process of step S85.

In the process of the step S85, the display map creation unit 9 superimposes the route found by the process of the step S84 on the map screen created by the process of the step S83. The process of the step S85 is thus completed, and the display process proceeds from the process of the step S85 to a process of step S86.

In the process of the step S86, the display map creation unit 9 displays the map screen with the route from the current position to the destination superimposed thereon on the display device 10. The process of the step S86 is thus completed, and the series of steps of the display process is terminated.

As apparent from the above description, in the navigation system 81 as the seventh embodiment of the present invention, the route search computation unit 83 searches for the route to the destination under the condition that the risk cost is minimized with reference to the environmental change risk database 64. Accordingly, the driver can reach the destination through the route low in the risk cost, in other words, the route with a low troublesome degree.

Figure 25:
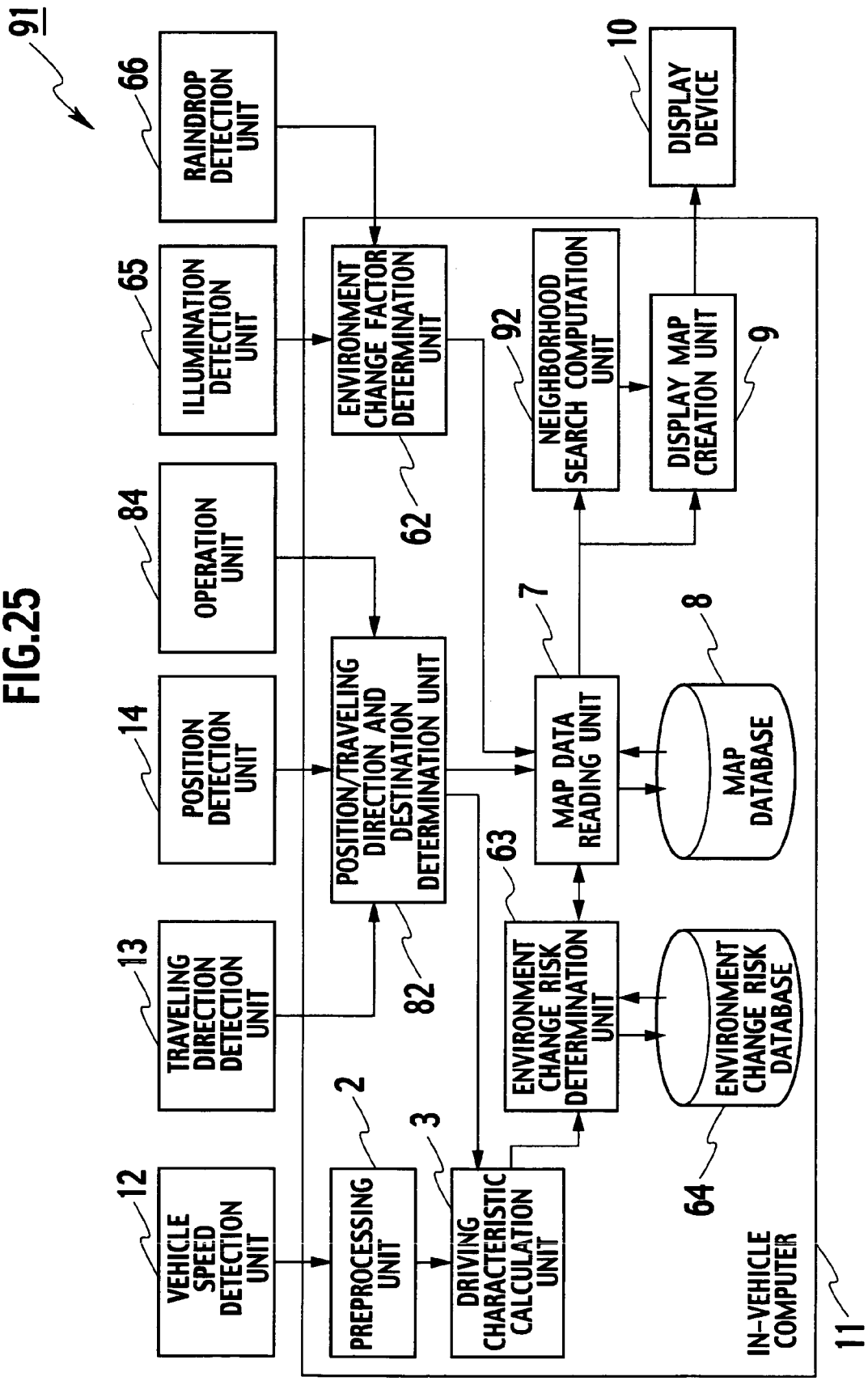
FIG. 25 is a block diagram showing a configuration of a navigation system as an eighth embodiment of the present invention.

Next, a description is given of a configuration and an action of a navigation system as an eighth embodiment of the present invention with reference to FIGS. 25 and 26.

A navigation system 91 as the eighth embodiment of the present invention includes, as shown in FIG. 25, the preprocessing unit 2, the driving characteristic calculation unit 3, the environmental change factor determination unit 62, the map data reading unit 7, the map database 8, the display map creation unit 9, the environmental change risk determination unit 63, the environmental change risk database 64, the position/traveling direction and destination determination unit 82, and a neighborhood search computation unit 92 as main components. The navigation system 91 is configured to search for facilities around the vehicle under the condition that the risk cost is minimized upon the driver ordering search for the facilities around the vehicle by means of the operation unit 84. Each of the components including the preprocessing unit 2, the driving characteristic calculation unit 3, the environmental change factor determination unit 62, the map data reading unit 7, the display map creation unit 9, the environmental change risk determination unit 63, the position/traveling direction and destination determination unit 82, and the neighborhood search computation unit 92 is implemented by the in-vehicle computer 11 executing a computer program defining a function (action) of the component.

The navigation system 91 having the above configuration operates as follows to search for facilities around the vehicle under the condition that the risk cost is minimized. Hereinafter, a detailed description is given of the action of the navigation system 91 executing a map display process with reference to a flowchart shown in FIG. 26. A risk cost process in the navigation system 91 as the eighth embodiment is the same as that of the above fifth embodiment, and the description thereof is omitted.

The flowchart shown in FIG. 26 starts upon the driver operating the operation unit 84 to order search for facilities around the vehicle, and the display process proceeds to a process of step S91.

In the process of the step S91, the position/traveling direction and destination determination unit 82 detects information of the current position and traveling direction of the vehicle as the current traveling situation through the traveling direction detection unit 13 and position detection unit 14. The environmental change factor determination unit 62 extracts information of the illumination outside the vehicle and rainfall as the current environmental change factor through the illumination detection unit 65 and raindrop detection unit 66. The process of the step S91 is thus completed, and the display process proceeds from the process of the step S91 to a process of step S92.

In the process of the step S92, the map data reading unit 7 reads map data corresponding to the current position and traveling direction of the vehicle detected by the process of the step S91 from the map database 8. The process of the step S92 is thus completed, and the display process proceeds from the process of the step S92 to a process of step S93.

In the process of the step S93, the display map creation unit 9 creates a map screen showing information of the current position of the vehicle and map information around the vehicle using the map data read by the process of the step S92. The process of the step S93 is thus completed, and the display process proceeds from the process of the step S93 to a process of step S94.

In the process of the step S94, the neighborhood search computation unit 92 retrieves facilities around the vehicle and searches for a route from the current position to each of the facilities using a route search method such as the Dijkstra algorithm with reference to the map database 8. In the process, the neighborhood search computation unit 92 sets a larger weight for the link cost of a link including the traveling situation with a higher risk cost in the current environmental change factor with reference to the environmental change risk database 64 so as to search for a route minimizing the risk cost to each facility. The process of the step S94 is thus completed, and the display process proceeds from the process of the step S94 to a process of step S95.

In the process of the step S95, the display map creation unit 9 superimposes the route found by the process of the step S94 on the map screen created by the process of the step S93. The process of the step S95 is thus completed, and the display process proceeds from the process of the step S95 to a process of step S96.

In the process of the step S96, the display map creation unit 9 displays the map screen with the routes from the current position to the neighboring facilities superimposed thereon on the display device 10. In the process, the display map creation unit 9 may display a list of the retrieved facilities on the display device 10. The process of the step S96 is thus completed, and the series of steps of the display process is terminated.

As apparent from the above description, in the navigation system 91 as the eighth embodiment of the present invention, the neighborhood search computation unit 92 retrieves facilities around the vehicle under the condition that the risk cost is minimized with reference to the environmental change risk database 64. Accordingly, the driver can reach each facility around the vehicle through a route with a lower risk cost, in other words, a route with a low troublesome degree.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The entire content of Patent Application Nos. TOKUGAN 2004-144938 and TOKUGAN 2004-144941 with a filing date of May 14, 2004, is hereby incorporated by reference.

What is claimed is:

1. A navigation system performing route guidance for a vehicle in which the navigation system is mounted, comprising:
    a preprocessing unit calculating a second-order differential value of speed of the vehicle as a jerk and calculating an value obtained by accumulating any one of an absolute value and a square value of the jerk in a certain period of time;
    a driving characteristic calculation unit determining whether the accumulated value is equal to or above a predetermined threshold value;
    a position/traveling direction determination unit determining a position and a traveling direction of the vehicle;
    a troublesome driving place database storing information of an intersection at which the accumulated value is calculated to be equal to or above the predetermined threshold value and information of the traveling direction of the vehicle at the intersection in association with each other;
    a troublesome driving place determination unit calculating a risk cost of a driver at each of intersections around the vehicle for each traveling direction of the vehicle with reference to the troublesome driving place database; and
    a route guidance unit configured to perform route guidance using the risk cost of a driver calculated by the troublesome driving place determination unit.

2. The navigation system according to claim 1, wherein the troublesome driving place database comprises an intersection model storage unit storing a plurality of intersection shape patterns, and an intersection model reference unit determining an intersection shape pattern similar to a shape of the intersection at which the accumulated value is calculated to be equal to or above the predetermined threshold value from the plurality of intersection shape patterns, and the intersection model storage unit stores information of the determined intersection shape pattern and the information of the traveling direction of the vehicle in association with each other.

3. The navigation system according to claim 1, further comprising:
    a display map creation unit displaying map information around the vehicle on a display unit, wherein
    the display map creation unit superimposes the risk cost calculated by the troublesome driving place determination unit at a position corresponding to the intersection on a map.

4. The navigation system according to claim 1, further comprising:
an interrupt message creation unit indicating information promoting safe driving in response to the traveling direction of the vehicle changing into a traveling direction with a higher risk cost at an intersection.

5. The navigation system according to claim 1, further comprising:
a route search computation unit searching for a route to a destination set, wherein
the route search computation unit searches for a route to the destination under the condition that the risk cost is minimized with reference to the troublesome driving place database.

6. The navigation system according to claim 1, further comprising:
a neighborhood search computation unit retrieving facilities around the vehicle with reference to a map database, wherein
the neighborhood search computation unit retrieves the facilities around the vehicle under the condition that the risk cost to each facility is minimized with reference to the troublesome driving place database.

7. A navigation system performing route guidance for a vehicle in which the navigation system is mounted, comprising:
a preprocessing unit calculating a second-order differential value of speed of the vehicle as a jerk and calculating a value obtained by accumulating any one of an absolute value and a square value of the jerk in a certain period of time;
a driving characteristic calculation unit determining whether the accumulated value is equal to or above a predetermined threshold value;
a traveling situation determination unit determining a traveling situation of the vehicle;
an environmental change factor determination unit determining an environmental change factor outside the vehicle;
an environmental change risk database storing information of the traveling situation of the vehicle and information of the environmental change factor when the accumulated value is equal to or above the predetermined threshold value in association with each other;
an environmental change risk determination unit calculating a risk cost of a driver to the environmental change factor outside the vehicle for each traveling situation; and
a route guidance unit configured to perform route guidance using the risk cost of a driver calculated by the environmental change risk determination unit.

8. The navigation system according to claim 7, further comprising:
a display map creation unit displaying map information around the vehicle on a display unit, wherein
the display map creation unit superimposes and displays the traveling situation with a high risk cost for the driver in the current environmental change factor on the map information.

9. The navigation system according to claim 7, further comprising:
an interrupt message creation unit indicating information promoting safe driving in response to the traveling situation of the vehicle changing into the traveling situation with a higher risk cost for the driver.

10. The navigation system according to claim 7, further comprising:
a route search computation unit searching for a route to a set destination, wherein
the route search computation unit searches for a route to the destination under the condition that the risk cost is minimized with reference to the environmental change risk database.

11. The navigation system according to claim 7, further comprising:
a neighborhood search computation unit retrieving facilities around the vehicle with reference to a map database, wherein
the neighborhood search computation unit retrieves the facilities around the vehicle under the condition that the risk cost to each facility is minimized with reference to the environmental change risk database.

* * * * *